(12) United States Patent
Cravens

(10) Patent No.: US 11,972,276 B2
(45) Date of Patent: Apr. 30, 2024

(54) DISTRIBUTED ANALYTICS DEVELOPMENT PLATFORM

(71) Applicant: Analytics HQ, LLC, Suwanee, GA (US)

(72) Inventor: Chad P. Cravens, Suwanee, GA (US)

(73) Assignee: Analytics HQ, LLC, Suwanee, GA (US)

( * ) Notice: Subject to any disclaimer, the term of this patent is extended or adjusted under 35 U.S.C. 154(b) by 0 days.

(21) Appl. No.: 18/249,935

(22) PCT Filed: Sep. 30, 2022

(86) PCT No.: PCT/US2022/077395
§ 371 (c)(1),
(2) Date: Apr. 20, 2023

(87) PCT Pub. No.: WO2023/149968
PCT Pub. Date: Aug. 10, 2023

(65) Prior Publication Data
US 2023/0315496 A1    Oct. 5, 2023

Related U.S. Application Data

(60) Provisional application No. 63/267,488, filed on Feb. 3, 2022.

(51) Int. Cl.
*G06F 9/451*       (2018.01)
*G06F 9/54*        (2006.01)

(52) U.S. Cl.
CPC .............. *G06F 9/451* (2018.02); *G06F 9/541* (2013.01)

(58) Field of Classification Search
CPC ........ G06F 9/451; G06F 9/541; G06F 16/182; G06F 8/60; G06F 8/61; H04L 67/10; H04L 67/306
See application file for complete search history.

(56) References Cited

U.S. PATENT DOCUMENTS 10,880,376 B1    12/2020  Green
11,082,495 B1    8/2021   Vidudala et al.
(Continued)

FOREIGN PATENT DOCUMENTS

CN    112968960 A      6/2021
EP       4002098 A1    5/2022
WO    2018053122 A1    3/2018

OTHER PUBLICATIONS

89th Mors Symposium, Analytics to Enhance Decision Making, Jun. 2021, 283 pages, entire document Including pp. 262-263, Abstract No. 56763 By Chad Cravens.
Amazon SageMaker, Step 1: Create an Amazon SageMaker Notebook Instance, retrieved from the internet https://docs.aws.amazon.com/sagemaker/latest/dg/gs-setup-working-env.html.
Amazon, SageMaker Operators for Kubernetes, retrieved from the internet https://docs.aws.amazon.com/sagemaker/latest/dg/kubernetes-sagemaker-operators.html.
(Continued)

Primary Examiner — Alvin H Tan
(74) Attorney, Agent, or Firm — Thompson Patent Law

(57) ABSTRACT

Apparatus and associated methods relate to a distributed analytics development platform (DADP) capable of automatically maintaining a multiple user development environment in real-time. In an illustrative example, a DADP includes a user interface (UI) layer, an application programming interface (API) layer, and an orchestration layer. The orchestration layer, for example, includes tool instances deployed for each of the multiple users. The orchestration layer may further include a multi-instance common orchestration service (COS) having an orchestration service instance (OSI) deployed in each of the tool instances. The COS, for example, may access a current state of each tool instance associated with the user in the orchestration layer and update a dynamic system state profile based on a current state of each of the tool instances. Various embodiments may advantageously provide an autonomously updated analytic development environment for deployment and maintenance of the tool instances in real-time.

28 Claims, 17 Drawing Sheets

(56) References Cited

U.S. PATENT DOCUMENTS

| | | |
|---|---|---|
| 11,113,353 B1 | 9/2021 | Echeverria et al. |
| 11,194,552 B1 | 12/2021 | Echeverria et al. |
| 11,368,516 B1 | 6/2022 | Lee |
| 2011/0219146 A1 | 9/2011 | Jacobson et al. |
| 2013/0013562 A1 | 1/2013 | Sudhakar |
| 2016/0034809 A1 | 2/2016 | Trenholm et al. |
| 2017/0070558 A1 | 3/2017 | Broadhurst |
| 2017/0139978 A1 | 5/2017 | Hayworth et al. |
| 2018/0314606 A1 | 11/2018 | Bronk |
| 2019/0238590 A1 | 8/2019 | Talukdar et al. |
| 2020/0004598 A1 | 1/2020 | Brebner |
| 2021/0133000 A1 | 5/2021 | Okman |
| 2021/0157622 A1 | 5/2021 | Bache et al. |
| 2021/0176340 A1 | 6/2021 | Rose |
| 2021/0200814 A1 | 7/2021 | Tal et al. |
| 2021/0203445 A1 | 7/2021 | Yanovsky et al. |
| 2021/0224084 A1 | 7/2021 | Molchanov et al. |
| 2021/0274266 A1 | 9/2021 | Lohmar et al. |
| 2021/0374107 A1 | 12/2021 | Kamo et al. |

OTHER PUBLICATIONS

Amazon, Start Building on AWS Today, retrieved from the internet //aws.amazon.com/.

Chandakanna, V, Rehdfs: A random read/write enhanced HDFA, Journal of Network and Computer Applications, Dec. 8, 2017, 16 pages.

Daniel, et al, Introducing Amazon SageMaker Operators for Kubernetes, Dec. 2, 2019, retrieved from the internet https://aws.amazon.com/blogs/machine-learning/introducing-amazon-sagemaker-operators-for-kubernetes/.

International Search Report and Written Opinion of the International Searching Authority in related International Application No. PCT/US2022/077395, dated Feb. 23, 2023, 25 pages.

Kranz, et al, Amazon SageMaker, TechTarget, Aug. 2021, retrieved from the internet https://www.techtarget.com/searchaws/definition/Amazon-SageMaker.

Open Source Systems, Cloud-Native Data Analytics, slide deck presented in 89th Mors Symposium, Jun. 2021, 24 pages.

Whitepaper, Mathine Learning on Amazon SageMaker and Kubernetes, retrieved from the internet https://d2908q01vomqb2.cloudfront.net/f1f836cb4ea6efb2a0b1b99f41ad8b103eff4b59/2019/12/04/Machine-Learning-on-Amazon-SageMaker-and-Kubernetes.pdf.

Step 3 – Select all the library bundle(s) you would like added to your Notebook (One, Multiple or None)

Supervised learning
Supervised learning is a machine learning function that produces a predictive output based on a training data sets provided to the algorithm.

UnSupervised learning
Unsupervised learning is a class of algorithms that are able to infer patterns from untagged data and exhibits self organization to capture patterns and data.

Deep Learning
Deep learning is a subfield of machine learning inspired by the structure of the brain that leveraged neural networks to learn using large amounts of data and make predictions on that data.

Statistical Analysis
Statistical Analysis is the process of using standard algorithms and mathematical processes to identify patterns and trends in data.

Timeseries Analysis
Time series Analysis is a statistical method that specifically deals with trend analysis of data as it changes over time.

Visualization and Charting
Visualization and charting is the analysis of natural language and using automated methods for extracting content and understanding from it.

Distributed Analytics
Distributed Analytics provides a suite of tools and libraries that enable parallel computations for large-scale data analytics.

Reinforcement learning
Reinforcement learning is an area of machine learning that focuses on how intelligent agents should take actions in a defined environment in order to maximize the reward.

Optimization
Optimization is a prescriptive field of analytics that uses data to optimize a certain problem space given variables and constraints

Model Explainability
Model Explainability is a suite of tools and methodologies that provide insight into how machine learning models make their decisions and identifying crucial features for their decision making.

FIG. 9

Build-A-Notebook

1) Notebook type    2) Languages    3) Bundles    4) Libraries    5) Confirm and Build!

Step 4 - Select libraries you would like to include in your notebook (One, Multiple or None)

[PREVIOUS]    [NEXT]

Step 5 - Set the name, Review and build your Notebook (Must Set Notebook Name)

*Notebook Name

Notebook Name

Provide a name for the notebook that summarizes its purpose for you. (i.e. – My NLP Notebook with Visualizations)

Selected Notebook

Jupyter
Jupyter is a leading platform for performing analytics in a browser. Jupyter supports dozens of programming languages via Jupiter Kernels as well as numerous helper utilities and integration with visualization libraries.

Selected Languages

Python
Python is the most popular data analytics in machine learning development language and use today.

Scala
Scala combines object oriented and functional programming paradigms that run in a Java virtual machine (JVM).

Julia
Julia is an open source in highly-efficient programming language growing in popularity for statistical computing.

R
R is a popular open source language for statistical computing and machine learning.

- Supervised learning
  Supervised learning is a machine learning function that produces a predictive output based on a training data sets provided to the algorithm.

- Deep Learning
  Deep learning is a subfield of machine learning inspired by the structure of the brain that leveraged neural networks to learn using large amounts of data and make predictions on that data.

- Statistical analysis
  Statistical Analysis is the process of using standard algorithms and mathematical processes to identify patterns and trends in data.

- Model Explainability
  Model Explainability is a suite of tools and methodologies that provide insight into how machine learning models make their decisions and identifying crucial features for their decision making.

- Computer vision enables computers to infer high-level understanding of digital images and videos, typically seeking to automate the functions of the human visual system.

Selected Libraries
None

PREVIOUS        NEXT

FIG. 11

DISTRIBUTED ANALYTICS DEVELOPMENT PLATFORM

CROSS-REFERENCE TO RELATED APPLICATIONS

This application is a national stage application under 35 U.S.C. 371 of and claims the benefit of PCT/US2022/077395, titled "Asynchronous Distributed Data Transfer System," filed by Chad P. Cravens, on Sep. 30, 2022, which application claims the benefit of U.S. Provisional Application Ser. No. 63/267,488, titled "Asynchronous Distributed Data Transfer System," filed by Chad P. Cravens, on Feb. 3, 2022. This application incorporates the entire contents of the foregoing application(s) herein by reference.

TECHNICAL FIELD

Various embodiments relate generally to instances deployment and control in a distributed communication network.

BACKGROUND

Big data analysis may refer to an analysis of data sets that are very large. Sometimes, these datasets may be too complex to be dealt with by traditional data-processing applications. For example, big data analysis may pose challenges in capturing data, data storage, data analysis, search, sharing, transfer, visualization, querying, updating, information privacy, and data source. Big data analysis often has three main considerations volume, variety, and speed.

SUMMARY

Apparatus and associated methods relate to a distributed analytics development platform (DADP) configured to automatically coordinate a distributed, multiple user development environment in real-time. In an illustrative example, a DADP includes a user interface (UI) layer, an application programming interface (API) layer, and an orchestration layer. The orchestration layer, for example, includes tool instances deployed for each of the multiple users. The orchestration layer may further include a multi-instance common orchestration service (COS) having an orchestration service instance (OSI) deployed in each of the tool instances. The COS, for example, may access a current state of each tool instance associated with the user in the orchestration layer and update a dynamic system state profile based on a current state of each of the tool instances. Various embodiments may advantageously provide an autonomously updated analytic development environment for deployment and maintenance of the tool instances in real-time.

Various embodiments may achieve one or more advantages. For example, some embodiments may advantageously provide user interfaces for a user to deploy standardized tool instances based on user selections. Some embodiments may, for example, include a suite of APIs configured to advantageously provide automatic and standardize functions for each instance of the COS. For example, some embodiments may include autonomous processing nodes to transfer very large data files across a network efficiently. For example, the autonomous processing nodes may be configured to automatically operate without active management to advantageously reduce usage of computational resources.

In some implementations, the DADP may include distributed autonomous processing nodes configured to transfer excess size data files across a network. For example, an excess size data file transfer may be initiated by receiving, at an autonomous processing node, a first data chunk of a data block that is part of a data file. For example, the autonomous processing node may discover from multiple data storage shards, additional data chunks of the data block of the data block. Upon determining that all distinct data chunks corresponding to the data block are discovered, for example, the autonomous processing node may request an assembly lock on the data block in a unified lock structure. After the assembly lock is obtained, for example, other autonomous processing nodes may be prevented from reassembling the data block. For example, accordingly, the autonomous processing nodes may reassemble the distributedly stored data block of the data file with the discovered data chunks. Various embodiments may advantageously preserve computational resources by preventing more than one autonomous processing node from reassemble the data block.

The details of various embodiments are set forth in the accompanying drawings and the description below. Other features and advantages will be apparent from the description and drawings, and from the claims.

BRIEF DESCRIPTION OF THE DRAWINGS

FIG. 7, FIG. 8, FIG. 9, FIG. 10, FIG. 11, FIG. 12A, FIG. 12B, and FIG. 13 depict exemplary user interfaces for deploying new tool instances in the DADP.

Like reference symbols in the various drawings indicate like elements.

DETAILED DESCRIPTION OF ILLUSTRATIVE EMBODIMENTS

To aid understanding, this document is organized as follows. First, to help introduce discussion of various embodiments, a distributed analytic development platform (DADP) is introduced with reference to FIGS. 1-2. Second, that introduction leads into a description with reference to FIGS. 3-6 of some exemplary embodiments of a file transfer system for very large data files. Third, with reference to FIGS. 7-13, various user interfaces are described in application to exemplary tool instance deployment. Fourth, with reference to FIGS. 14-16, this document describes exemplary methods useful for DADP control and operations. Finally, the document discusses further embodiments, exemplary applications and aspects relating to a distributed analysis network.

As data production grows exponentially, demands for a consumption, translate, store and analysis of various data grows exponentially. In some examples, when the ability to securely access data and compute increases, more data science applications may be developed and produced. As data production grows exponentially, needs to consume, translate, store, and analyze grows exponentially along with a need for an ability to securely access the data and compute.

Figure 1:
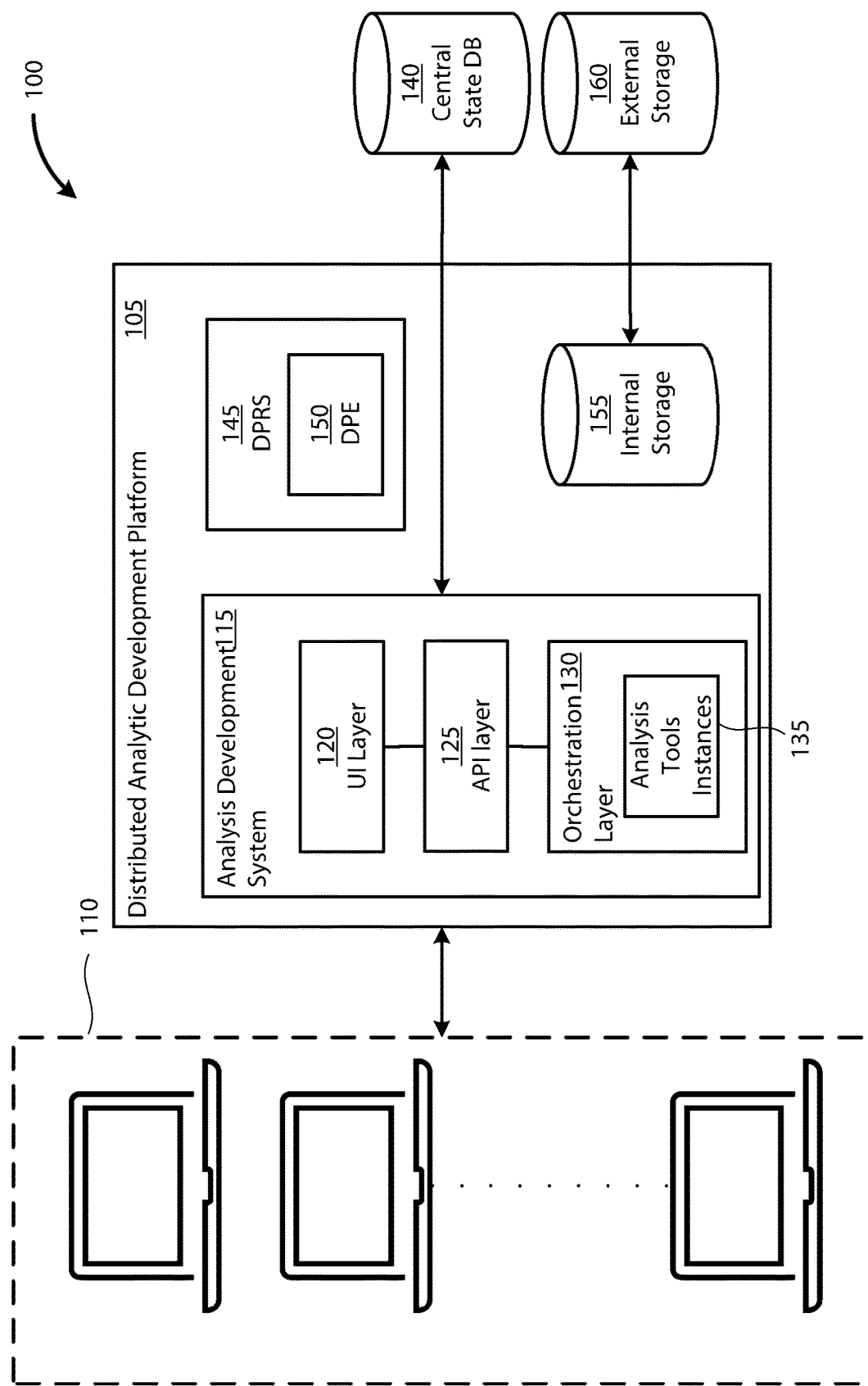
FIG. 1 depicts an exemplary Distributed Analytic Development Platform (DADP) employed in an illustrative use-case scenario.

FIG. 1 depicts an exemplary Distributed Analytic Development Platform (DADP) employed in an illustrative use-case scenario. In a distributed analysis network 100, a DADP 105 is connected to a distributed network of user devices 110. For example, some of the user devices 110 may be located in different locations to other user devices 110. For example, the user devices 110 may include desktop computers. For example, the user devices 110 may include laptop computers. For example, the user devices 110 may include mobile devices (e.g., tablet computing device, smart phone).

In some implementations, the user devices 110 may be authenticated to use the DADP 105 by providing user credentials to the DADP 105. For example, the user devices 110 may use the DADP 105 via a web browser interface. In some implementations, the DADP 105 may provide various tools available for the user devices 110. For example, the user devices 110 may generate instances of the tool to perform various tasks. For example, the user devices 110 may use the tool instances to generate data science analysis.

The DADP 105 includes an analysis development system (ADS 115). In various implementations, the ADS 115 may generate an analytic development environment (ADE) for each of the user devices 110. For example, each of the user devices 110 may individually configure the ADE to suit a usage of a user of the user device 110. In some implementations, the ADE may be a user-specific, independent development environment. In some examples, the ADE may be configured to include a predetermined set of analysis tool (AT) instances, a predetermined resource allocated to the ADE, and a predetermined set of relevant research data set based on user input.

The DADP 105 includes a user interface layer (UI layer 120), an application programming interface layer (API layer 125), and an orchestration layer 130. For example, the UI layer 120 may individually generate UIs to the user devices 110. For example, the UI layer 120 may generate a UI to each of the user devices 110 based on an operation state associated with the corresponding user devices 110. The UI layer 120 also receives user input via the generated UI from the user devices 110. Based on the user input (e.g., deploy a new tool instance for analysis), for example, the UI layer 120 may generate a UI command (e.g., Kubernetes commands) to the API layer 125. In some implementations, the UI command may include commands to manage deployment, viewing, and integration of services.

In some implementations, the API layer 125 may be configured to deploy and control AT instances 135 in the orchestration layer 130 based on the command from the UI layer and an environmental state of the ADS 115. For example, after receiving a command to deploy a new AT instance from the UI layer 120, the API layer 125 may generate a command to deploy the new AT instance based on a predetermined set of parameters, selected based on the environmental state and configuration maps (e.g., as Kubernetes objects). In some implementations, the API layer 125 may pass control of the newly deployed AT instance to the orchestration layer 130. For example, the API layer 125 may transmit a control handle of the AT instance to the orchestration layer 130.

The orchestration layer 130, in some implementations, may be configured to manage the AT instances and the ADE for each of the user devices 110. The AT instances, for example, may include instances of data science analysis tools. For example, the AT instances may include a PostgreSQL instance. For example, the AT instances may include one or more Apache Spark Cluster instances. For example, the AT instances may include a Jupyter Notebook instance. In some examples, the Jupyter Notebook instance may include customizable libraries and user keys to perform user-selected data analysis procedures. In some implementations, the orchestration layer 130 may advantageously automatically set up (preload) various libraries and configurations to the AT instances based on user input.

In some implementations, the ADE may include one or more CNI (container network interface) instances. For example, the orchestration layer may include the CNI instance(s). For example, the orchestration layer may configure the CNI instances to facilitate communication signals and/or data structures between multiple tools (e.g., instances of other tools). As an illustrative example, a CNI instance may, for example, include a Calico instance (e.g., available from Project Calico and/or Tigera, Inc., San Francisco, CA, USA). A CNI may, for example, be configured to optimize communications for purposes of big-data analytics.

In this example, a communication between the UI layer 120 and the API layer 125, and the API layer 125 and the orchestration layer 130 are connected using a persistent channel 275. For example, the persistent channel 275 may be using a MQ Telemetry Transport (MQTT) protocol. In various implementations, the persistent channel 275 may advantageously offer a real-time monitoring of a system environment at the UI layer 120, the API layer 125, and the orchestration layer 130. In some examples, the OSI 260 may also interface with the persistent channel 275 so that a change in state in the AT instance 135 may be advantageously quickly propagated throughout the ADS 115. For example, the persistent channel 275 may advantageously keep the central state database 140 updated in real-time. In some implementations, for example, a change in state may be advantageously propagated within one day. For example, a change in state may be propagated within minutes. In some examples, a change in state may be propagated substantially in real-time (e.g., seconds, substantially immediately).

In an illustrative example without limitation, the orchestration layer 130 may receive a user input (e.g., to run an analysis code) from the user device 110 via the UI layer 120 and the API layer 125. For example, the UI layer 120 may generate a command to the API layer 125 based on the user input and, for example, a state of the UI displayed at the user device 110 (e.g., an AT selected, a program code selected). The API layer may, for example, generate a command specific to the selected AT instance to execute the user input. After receiving the command from the API layer 125, the AT instances 135 in the orchestration layer 130 may perform the user input command. In some examples, after the performance is completed, the orchestration layer 130 may transmit an output signal to the UI layer 120 via the API layer 125. For example, the UI layer 120 may update the UI at the user device based on the output signal.

The ADS 115 is connected to a central state database 140. For example, the central state database 140 may include a Mongo database. In some implementations, the ADS 115 may update state variables at the central state database 140 in real-time based on a state of the ADS 115 at the orchestration layer 130. For example, when the API layer 125 causes the orchestration layer 130 to execute a predetermined command, the central state database 140 may advantageously automatically update in real time. In some implementations, the UI commands may be used to maintain central state DB of all active services.

In this example, the DADP 105 also includes a distributed packaging and reassembly system (DPRS 145). In various embodiments, the DPRS 145 may process (e.g., by one or more distribution packaging engine (DPE 150)) very large files (e.g., files exceeding available memory of one or more devices across the distributed analysis network 100) to be transferred from a source device (e.g., a storage device) to a target device. Very large files may, for example, be referred to as excess size files and/or oversized files. Excess size files and/or oversized files may, for example, exceed storage and/or memory capabilities and/or settings (e.g., maximum data transfer size) of one or more devices in a data transfer process (e.g., a sending device, a transferring device, a server, a receiving device, a processing device).

As shown, the DADP includes an internal storage 155 and an external storage 160. For example, the internal storage 155 may include one or more cloud storages that are mounted by a user to the ADS 115 using the user's credentials. For example, the external storage 160 may be data sources that are not securely mounted. In some implementations, the user may need to transfer very large data files (e.g., large data sets) to the internal storage to perform analysis securely. In some implementations, the ADS 115 may use the DPRS 145 to transfer the very large data files from the external storage 160 to the internal storage 155.

In the distributed analysis network 100, the user device 110 may, for example, transmit a request command via the UI layer to transfer a very large file from an external database to an internal database for analysis. The DPRS 145 may, for example, process the file on the source device. Processing may, for example, include generating one or more packaging data structures (PDSs) associated with (predetermined) attributes of the file. The PDSs may, for example, be associated with (e.g., define, reference) one or more portions (e.g., 'chunks') of the file. The chunks may, for example, be (pre)determined during processing. The PDSs may, for example, associate one or more identifiers (e.g., cryptographic hashes) with the file and/or one or more (e.g., all) of the chunks. The PDSs may, for example, associate chunks (e.g., each chunk) with a corresponding block. A block may, for example, include multiple chunks (e.g., in a specific order). The PDSs may, for example, associate one or more blocks (e.g., each block) with a (predetermined) position (e.g., sequence) relative to one another. In some embodiments one or more of the chunks may include one or more PDSs.

The chunks of the file may be transferred, by way of example and not limitation, to multiple receiving devices. The PDSs may be transferred to one or more of the multiple receiving devices. In some embodiments, multiple receiving devices may be individual physical computing devices (e.g., servers) connected by one or more networks. In some embodiments, multiple receiving devices may be logical instances of at least one physical computing device. The data structures and/or chunks may be transmitted in parallel (e.g., multiple chunks at the same time) to the multiple receiving devices (e.g., across one or more network connections). The PDSs and/or chunks may, for example, be transmitted asynchronously (e.g., not in an order of position of the chunks in relation to the original file). The DPRS 145 (e.g., by one or more DPE(s) 150) may, for example, compare one or more chunks received to one or more corresponding PDSs. The DPRS (e.g., by the DPE(s) 150, such as embodied on one or more receiving devices) may reassemble chunks into a corresponding block as a function of a corresponding PDS(s). The DPRS 145 may, for example, reassemble one or more blocks into a file.

In various embodiments, a block may be reassembled once (all) corresponding chunks are received by one or more receiving device(s). The block may be written to a storage location (e.g., temporary storage). For example, the block may be written to a storage location when an assembling exemplary distributed reassembly engine (DRE) determines that a previous block in sequence (e.g., as determined by the PDS(s), relative to the source file) is not available to append (e.g., not all corresponding chunks have been received yet). The storage location may, for example, include a database. The database may, for example, be physically stored in a memory device (e.g., random-access memory). The database may, for example, be physically stored in a storage device (e.g., non-volatile memory).

In some embodiments, by way of example and not limitation, the DPRS 145 may create blocks according to a (predetermined) file format (e.g., corresponding to a target storage location). The file format may, for example, be the same as a format of the source file. The file format may, for example, be different than that of the source file. In some embodiments, the file format may be determined by a target receiving device.

In various embodiments, the DPRS 145 may identify (e.g., uniquely) a (source) file. In some embodiments, the DPRS 145 may, for example, identify a source file and a target destination. In some embodiments, after interruption of a transfer operation (e.g., disconnection of the source device from the DPRS 145, the DPRS 145 may identify (e.g., automatically) the source file upon initiation of transfer (e.g., from a same source device, to a same target location). The DPRS 145 may, for example, cause the source device to begin transfer operations (e.g., chunking, transmitting) on the file at a location based on previous operations (e.g., a location of successful chunking, transmission, and/or receipt).

In various embodiments, the DPRS 145 may be configured to transfer a very large file resource efficiently by using independently autonomous DPEs 150 to reassemble data blocks of the very large file. For example, each of the data blocks may be distributedly stored in distinct data storage. For example, the DPEs 150 may independently and anonymously discover data chunks of the data block from distinct data storage shards. For example, upon determining that all distinct data chunks are discovered, the DPE 150 may request an assembly lock on the data block in a unified lock structure from the DPRS 145. In some implementations, the assembly lock may prevent other autonomous DPEs 150 from reassembling the data block. For example, other DPEs 150 may advantageously concentrate resources on discovering and reassembling other data blocks of the very large data file while the discovery process of the data chunk may be kept to be run in parallel to advantageously promote discovery speed.

Figure 2:
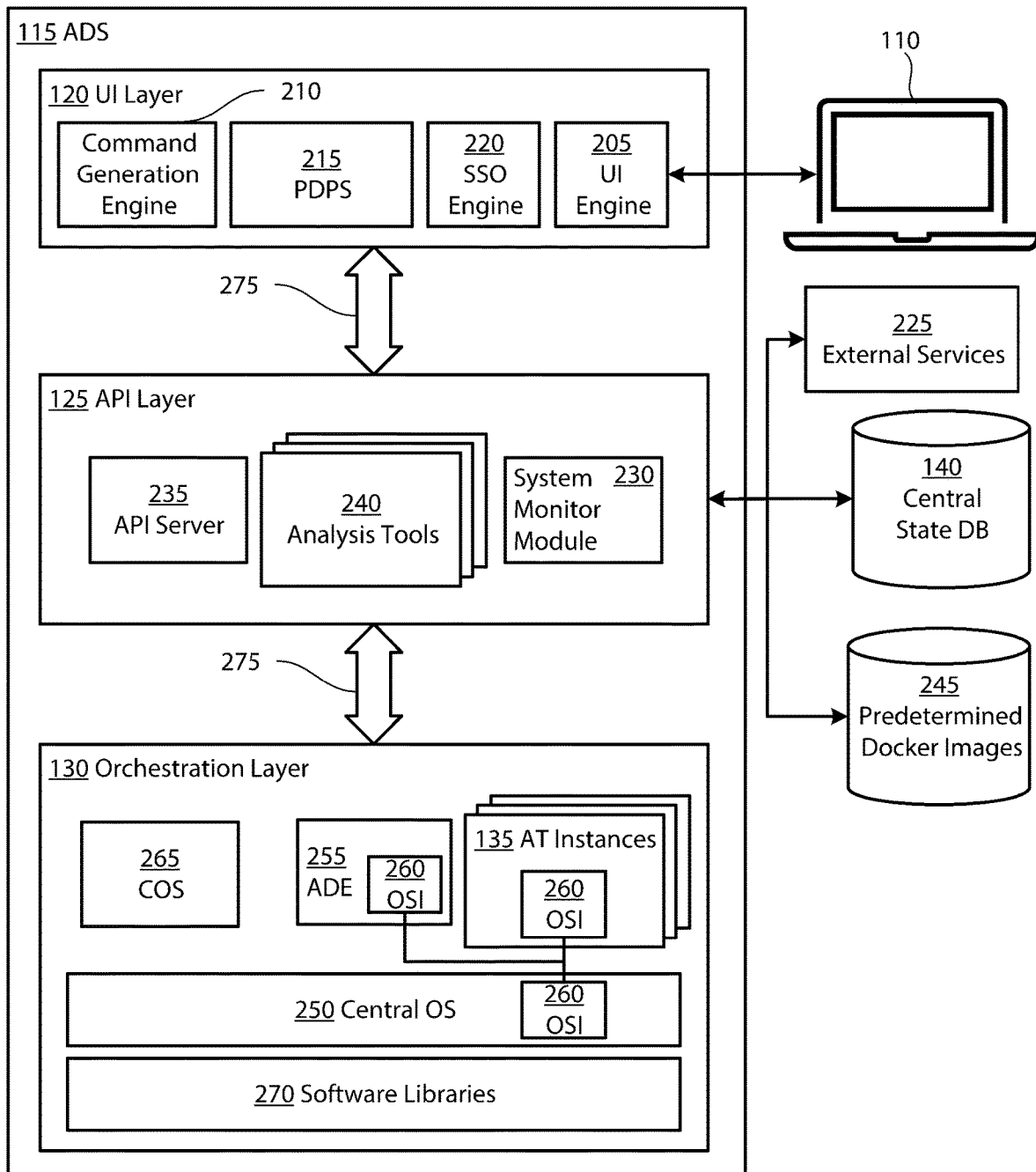
FIG. 2 is a block diagram depicting an exemplary Analysis Development System.

FIG. 2 is a block diagram depicting an exemplary Analysis Development System (ADS 115). The ADS 115 includes the UI layer 120, the API layer 125, and the orchestration layer 130 as described, for example, with reference to FIG. 1. As shown, the UI layer 120 includes a UI engine 205, a single sign-on engine (SSOE 220), a predetermined deployment parameter set (PDPS 215), and a command generation engine (CGE 210). The UI engine 205, for example, may generate and update UI displayed at the user device 110. For example, a user may also transmit commands to the ADS 115 using the UI displayed on the user device 110.

The CGE 210, for example, may generate commands based on user input. For example, the CGE 210 may generate commands to control the API layer 125. In this example, the CGE 210 may use the PDPS 215 to deploy AT instances 135 based on user input. For example, the PDPS 215 may include one or more parameter set used for deploying one or more of the AT instances 135. For example, the parameter set may be selected based on a type of notebook selected by the user, a type of target analysis to be performed with the notebook, and user selected software modules to be included in a newly deployed AT instance. In some implementations, the ADS 115 may advantageously use the PDPS 215 to automatically deploy one or more new AT instances without manually adjusting parameters in the new AT instances, the deployed AT instances, and the ADE.

The SSOE 220, for example, may include a database of authorized users of the ADS 115. In some implementations, a user may be signed on to external services 225. For example, the external services 225 may include external databases used by the user and the ADS 115. For example, the external service 225 may include software libraries and computation services connected to the ADS 115 and available to the user. For example, the user may be authorized to use some or all of the external services 225 connected to the ADS 115. In various examples, each of the external services 225 may include an independent sign-on process. Using the SSOE 220, the ADS 115 may advantageously sign-on to the external services 225 available to the user with one command. As shown in this example, the SSOE 220 may generate a command using the CGE 210 to the API layer 125 to authenticate a user to use the external services 225.

The API layer 125, in this example, includes an API server 235, a system monitor module 230, and one or more AT software packages 240. In some implementations, the API server 235 may generate commands to configure the AT software packages 240 based on received commands from the UI layer 120. For example, the API server 235 may configure parameters of one or more Jupyter Notebook based on user input and/or the PDPS 215. The AT software packages 240, for example, may control the deployed AT instances based on commands received from the API server 235.

The system monitor module 230 may, for example, update the central state database 140 based on state updates from the UI layer 120 and the orchestration layer 130. The API layer 125 is further connected to a predetermined docker image database (PDIDB 245). For example, the PDIDB 245 may include expected environmental variable values for building the orchestration layer 130.

As shown in FIG. 2, the orchestration layer includes a central operating system (central OS 250). For example, the central OS 250 may be configured to manage resource usage at the orchestration layer 130. In some implementations, the central OS 250 may be deployed by the API layer using the expected environmental variable values stored in the PDIDB 245. An ADE 255 may be deployed on the central OS 250. For example, the ADE 255 may include configurations (e.g., font size, predetermined parameters, previously deployed instances) specific to a user. As shown, the AT instances 135, the ADE 255, and the central OS 250 each includes an orchestration service instance (OSI 260). For example, the OSI 260 may include REST services. In some implementations, the OSI 260 may include a communication channel with the API layer 125. In this example, the OSIs 260 may be configured to interface with each other so that the AT instances 135, the central OS 250, and the ADE 255 may be in direct communication. For example, the OSI 260 may allow an automated interface to monitor an environment of the orchestration layer 130. The OSIs 260 may be configured to communicate with other OSIs in the ADS 115 to from a multi-instance common orchestration service (COS 265). The COS 265 may, for example, trigger a system event (e.g., degrading system health of the ADS 115, mounting a data storage by a user) based on predetermined criteria. In some examples, the COS 265 may automatically mount/dismount filesystems from the orchestration layer 130. The COS 265, for example, may automatically trigger actions in other service instances (e.g., other AT instances 135). In some examples, the COS 265 may broadcast a system-wide signal to notify the UI layer 120, the API layer 125, and the central state database 140 based on the system event.

The orchestration layer 130 further includes software libraries 270. For example, the software libraries 270 may include software code or modules useful for the AT instances 135. In some implementations, a user may selectively load the software libraries 270 into the AT instance 135 using the UI via the UI layer 120 and the API layer 125.

In an illustrative example, when the ADS 115 received a signal from the user device 110 to deploy a new AT instance (e.g., a new Jupyter notebook), the UI layer 120 may, for example, retrieve, from a first data store (e.g., the PDPS 215), a first set of configuration rules as a function of (a) the selected independent tool, (b) a selected usage of the selected independent tool, and (c) a credential of a user transmitting the user command. For example, the first set of configuration rules may include software modules, configuration parameters, and environmental parameters to be preloaded into the new AT instance. After retrieving the first set of configuration rules, the UI layer may transmit a command to the API layer 125. For example, the API layer 125 may retrieve, from the central state database 140, a second set of configuration rules as a function of the dynamic system state profile.

In some implementations, the API server 235 may apply the first set and the second set of configuration rules to generate a new AT tool instance in the ADE 255. For example, the API server 235 may retrieve setting parameters (e.g., system configurations parameters, access keys) from the central state database 140 to generate the new AT tool instance. Accordingly, inter-communications between the new AT instance and previously deployed AT instances may be connected within the orchestration layer. In some examples, the AT software packages 240 at the API layer 125 may be autonomously configured based on the current state retrieved from the OSIs 260.

Figure 3A:
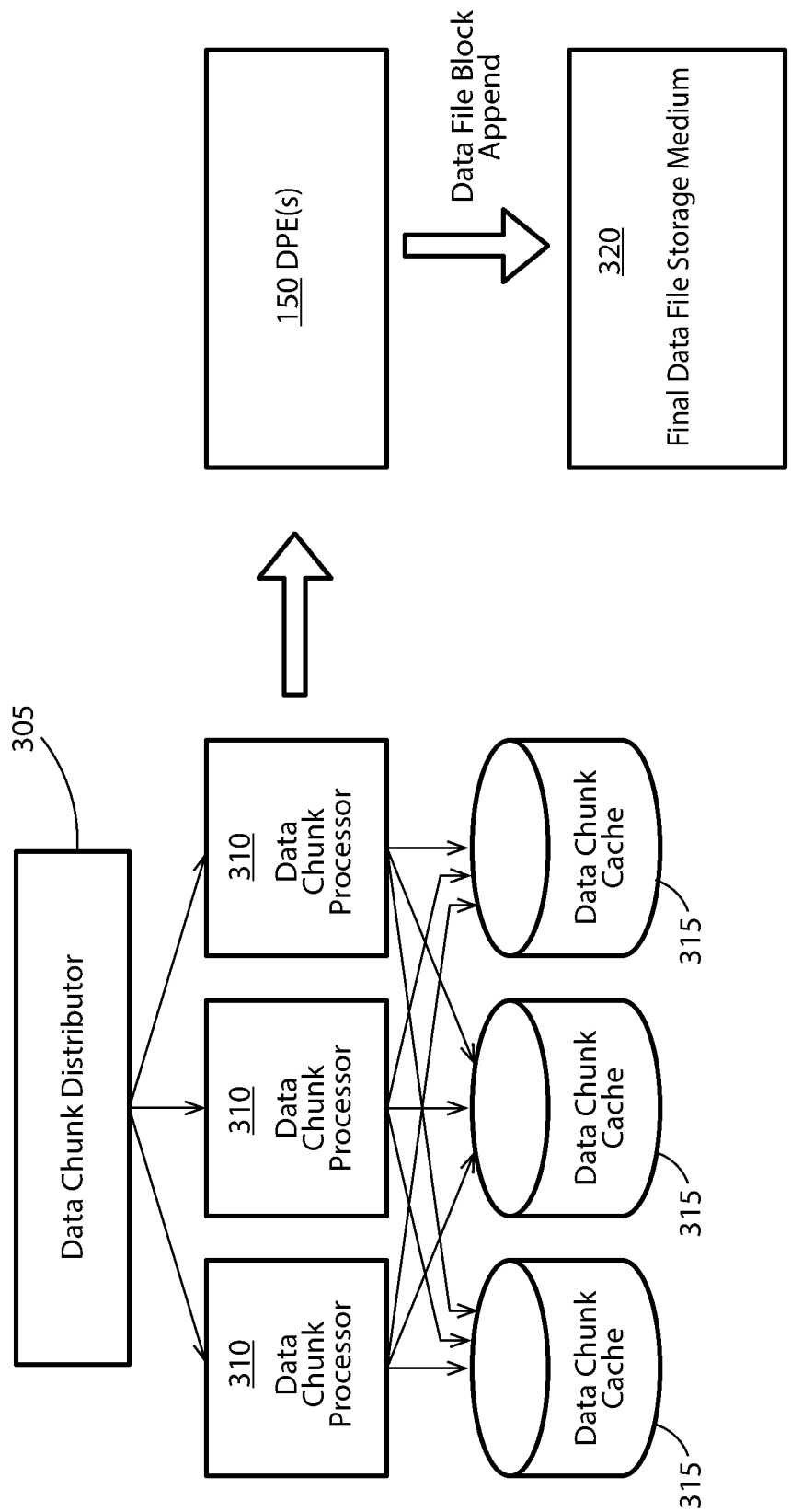
FIG. 3A is a block diagram depicting an exemplary distributed packaging and reassembly system.

FIG. 3A is a block diagram depicting an exemplary distributed packaging and reassembly system. In this example, the DPRS 145 includes a data chunk distributor 305, multiple data chunk processors 310, and multiple data chunk cache 315. For example, the data chunk distributor 305 may receive a file to be processed. For example, the file may be divided into data blocks. For example, the size of the data block may be determined based on a memory size of a receipt device. The data blocks may, for example, then be sent to the data chunk processors 310. For example, the data chunk processors 310 may divide the data block into data chunks to be stored in the data chunk cache 315. In various examples, the data chunk cache 315 may store distinct and non-redundant data shards of the data block.

When, for example, the file is to be received, the DPEs 150 may discover the data chunk from the data chunk cache 315. After all of the data chunk of a data block is discovered, for example, the DPE 150 may reassemble the data block and append the data block to a final data file storage medium 320. After all of the data blocks are reassembled, a complete version of the file may be retrieved from the final data file storage medium 320.

Figure 3B:
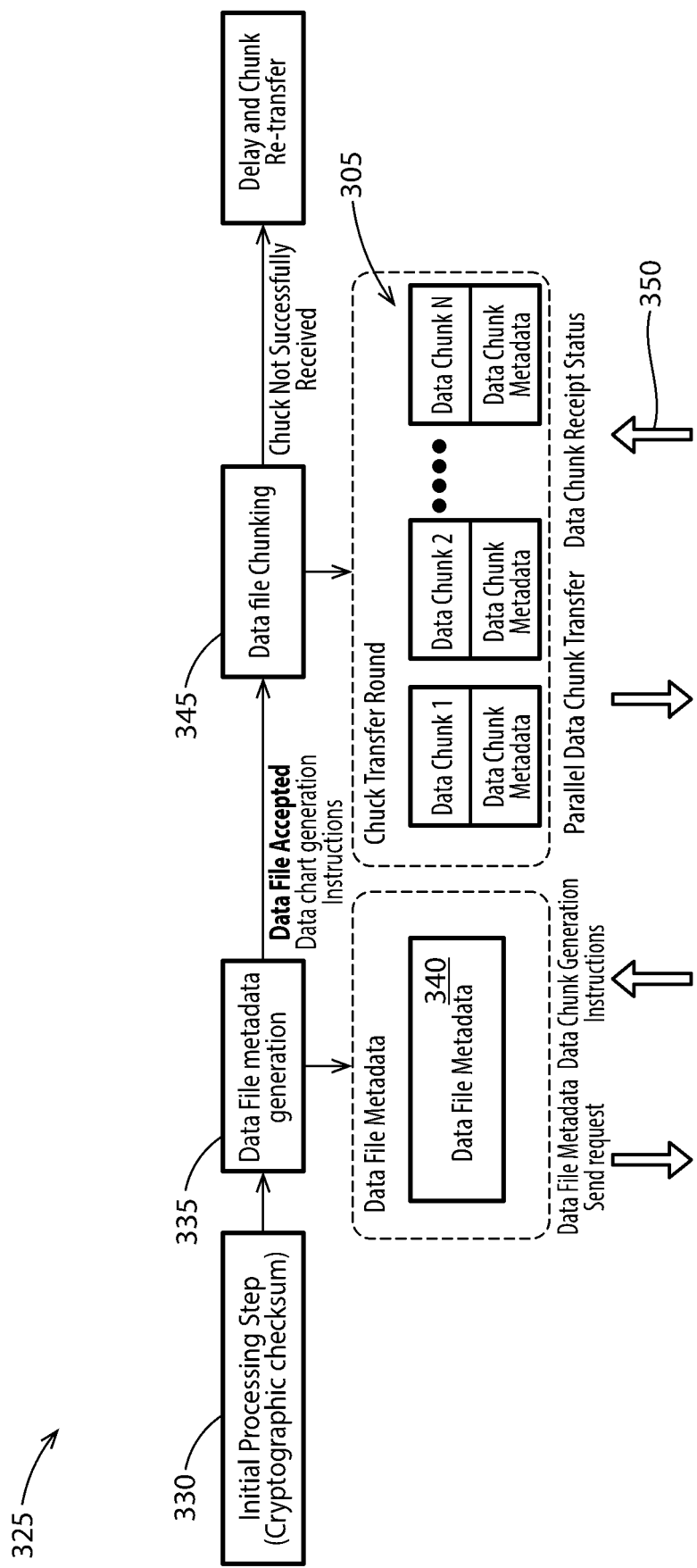
FIG. 3B depicts an exemplary data file transfer process of the distributed packaging and reassembly system.

FIG. 3B depicts an exemplary data file transfer process 325 of the distributed packaging and reassembly system. In some embodiments, the data file transfer process 325 may begin, for example, with an initial data file processing step 330 on a data file sender (e.g., a source device). The Data File Sender may, for example, be running a DPE and/or may receive instructions from a DPE. The data file transfer process 325 can be initiated by a human (e.g., via drag and drop into a browser, interacting with the UI generated by the UI layer 120). In some embodiments the data file transfer process 325 may, for example, be initiated by an automated process (e.g., command line interface, scheduled process, external event). In this example, the initial data file processing step 330 may include cryptographic checksum. For example, the cryptographic checksum may determine whether the file is genuine. Next, the data file transfer process 325 includes a data file metadata generation step 335. For example, the data file transfer process 325 may, for example, cause a DPE (e.g., hosted on a remote device, hosted on the source device, run on the source device) to generate one or more metadata attributes about the file to be transferred.

In some embodiments, a Data File Metadata (DFM) attributes may, by way of example and not limitation, include a number of chunks required to transfer the file (e.g., based on predetermined parameters of the DRE; dynamically determined based on attributes such as, by way of example and not limitation, source device memory, receiving device memory, network connection bandwidth, user preferences). The DFM may include, for example, a cryptographic integrity hash of the entire file (e.g., generated by the DPE). The DFM may include, for example, a size (e.g., a maximum size) of the file in bytes. The DFM may include, for example, a Data File Destination System ID (e.g., file system, S3, HDFS).

In various embodiments, once the DFM has been created, a File Transfer Request may, for example, be sent to a Data File Receiver (the DFR 410 in FIG. 4) (e.g., the recipient device) over a transfer link (e.g., one or more networks, the Internet) with the DFM.

In this example, during the data file metadata generation step 335, the DPRS 145 may receive a data chunk generation instruction from a recipient device. For example, the data chunk generation instruction may include parameters (e.g., size limit of data block) for the data file transfer process 325. After the data file metadata generation step 335 is completed, for example, a data file metadata 340 send request may be transmitted to the recipient device to transmit the generated metadata to the recipient device.

Next, the data file transfer process 325 includes a data file chunking step 345. For example, the data file chunking step 345 may divide the data file to be transferred into data block and data chunks as described with reference to FIG. 3A. If the data file is successfully divided, then data chunks of the data file may be transferred advantageously in parallel to a recipient device. For example, the data chunk distributor 305 may receive a data chunk receipt status 350 from the recipient device. In some examples, the data chunks may be uniquely distributed into the multiple data storage shards based on a predetermined access time.

Figure 4:
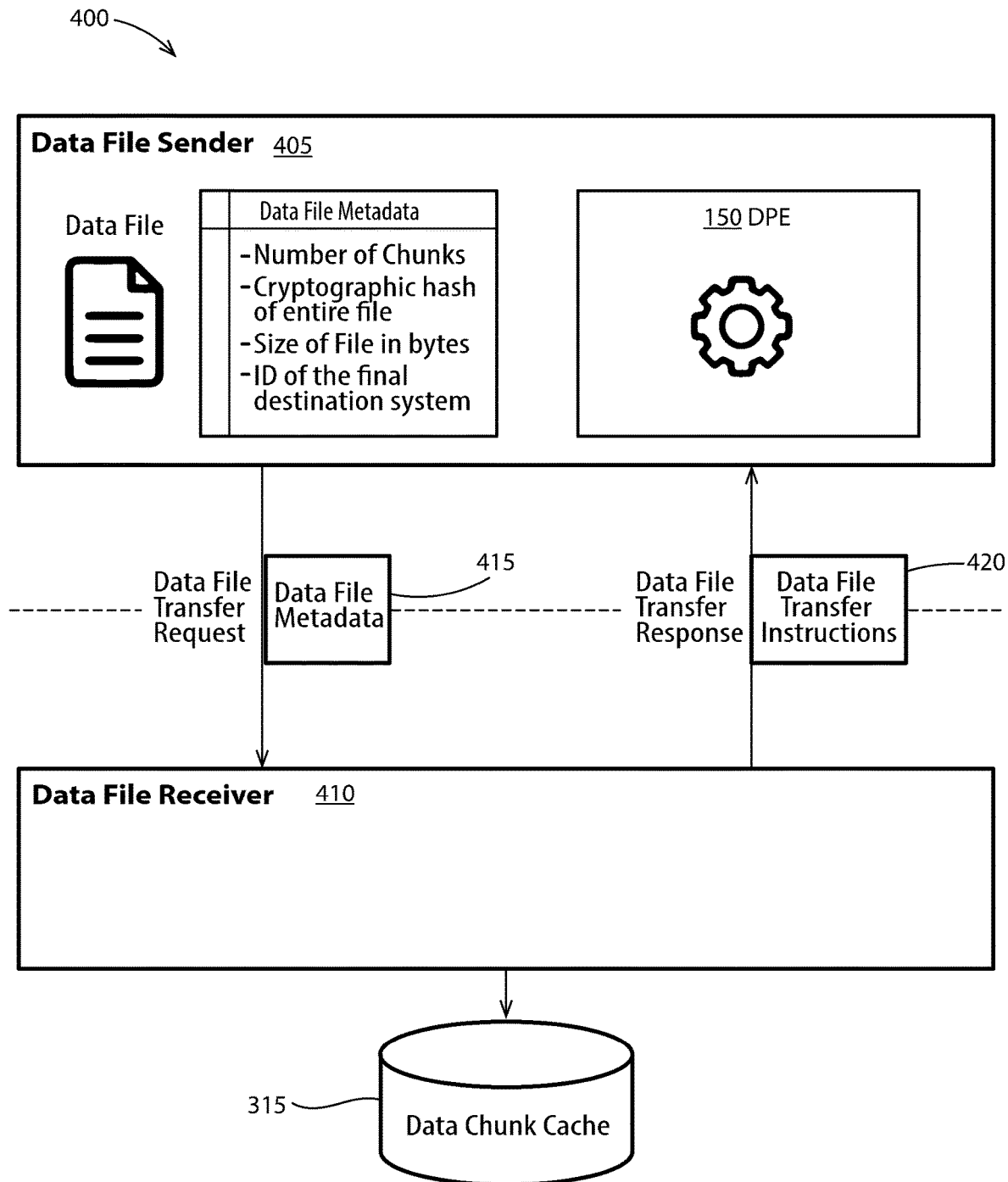
FIG. 4 is a block diagram showing an exemplary file transfer process between an exemplary data file sender and an exemplary data file receiver.

FIG. 4 is a block diagram showing an exemplary file transfer process 400 between an exemplary data file sender (DFS 405) and an exemplary data file receiver (DFR 410). The DFR 410 may, for example, be running a DRE and/or may receive instructions from a DRE. The DFR 410 may, for example, determine whether to accept the File Transfer Request (FTR). In this example, the FTR may be transmitted in a form of a data file metadata 415 (as described with reference to FIG. 3). The DFR 410 may, for example, respond to the DFS 405 with a Data File Transfer Instructions (DFTI 420) (e.g., transmitted as or within a data object). The DFTI 420 may, by way of example and not limitation, include a File Integrity Verification flag (e.g., a true/false flat indicating whether the file has already been transferred and verified), a Total Chunks Appended variable (e.g., how many data file chunks have been appended to the data file within the data file destination system 515), a total chunks uploaded to data chunk cache variable (e.g., how many data file chunks have been stored in the intermediary caching system), a data chunk size variable (how large the data chunks should be), a number of data chunks to send in parallel variable (how many data chunks to send at the same time), or a combination thereof.

In various embodiments, the exemplary file transfer process 400 may, for example, be invoked once the DFS 405 has received the DFTI 420. The exemplary file transfer process 400 may, for example, create file data chunks (e.g., by the DPE 150, on the source device) based on a data chunk size attribute from the DFTI 420. As an illustrative example, a file data chunk may be created by taking data from the data file starting at a first byte up to a number of bytes as instructed by the data chunk size in the DFTI 420.

In some implementations, a file data chunk metadata object (e.g., a PDS) may, for example, be generated based on the extracted file data chunk such as, by way of example and not limitation, including one or more of the following elements: data file chunk ID (the first data file chunk has an ID of 0 and is increased numerically for each following data file chunk), data file cryptographic hash, data file chunk cryptographic hash, Data File Destination System ID, data file chunk data, or a combination thereof.

The process of generating the data file chunk metadata 415 may, for example, be repeated up to multiple data chunks to send in parallel in the DFTI 420. A data file chunk transfer request may be sent, for example, to the DFR 410 over the transfer link (e.g., a private network or a public network) for data file chunks (e.g., all data file chunks) that have been generated in a current data file chunk transfer round. As shown, the DFR 410 is connected to the data chunk cache 315. For example, the DFR 410 may receive the data file from the data chunk cache 315 based on the data file metadata 415.

When a data file chunk Transfer Request is sent to the DFR 410, the DFR 410 may, for example, respond with a data file chunk Transfer Result (e.g., included in the data chunk receipt status). In some embodiments, for example, if the data file chunk Transfer Result indicates the data file chunk was not transferred correctly, then another data file chunk Transfer Request may be sent using the same parameters until the data file chunk Transfer Result indicates a successful transfer.

Figure 5:
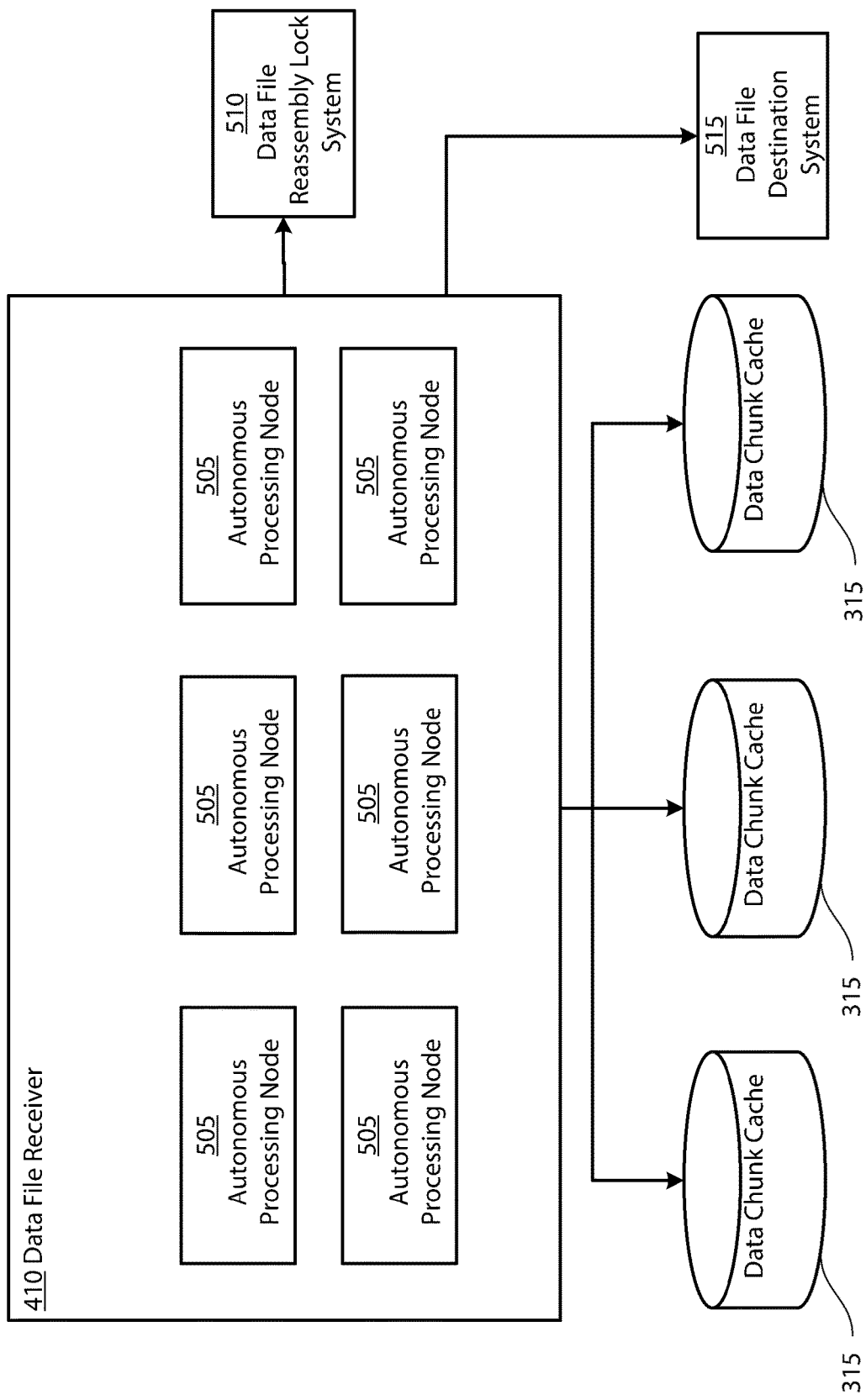
FIG. 5 is a block diagram depicting an exemplary data file receiver.

FIG. 5 is a block diagram depicting an exemplary Data File Receiver (DFR 410). In various embodiments, when a data file chunk Transfer Request is received by the DFR 410, the request may be distributed amongst one or more autonomous processing nodes 505. In some embodiments, an initial action, by way of example and not limitation, taken by the autonomous processing node 505 may be to put the data file chunk metadata 415 into, for example, the data chunk cache 315. In some implementations, the autonomous processing nodes 505 may be passively activated by a trigger event (e.g., a reception of a data chunk). For example, no direct instruction is required to activate or initiate the autonomous processing nodes 505.

In some implementations, the autonomous processing nodes 505 may be independent. For example, inter-communication between the autonomous processing nodes 505 may be unnecessary. In some embodiments, the autonomous processing nodes 505 may be anonymous the DPRS 145 and/or the DFR 410. For example, the DFR 410 may have no direct control at the autonomous processing nodes 505.

Once the data file chunk has been saved into the data chunk cache 315, for example, the autonomous processing node 505 may then determine a next data block that needs to be created. The autonomous processing nodes 505 may, for example, query the data chunk cache 315 to determine if enough data file chunks have been saved into the data chunk cache 315 to reassemble a data block. If it has been determined by the autonomous processing nodes 505 that enough data file chunks have been saved in the data chunk cache 315 to assemble a data block, for example, the autonomous processing nodes 505 may request a global data file reassembly lock (GDFRL) from a data file reassembly lock system 510. For example, the GDFRL may include a hash of the data file. For example, the GDFRL may include an identification of a corresponding data block. In some implementations, the identifications may be sequential and are dynamically generated based on predetermined system parameters.

In some implementations, the data file reassembly lock system 510 may grant (e.g., generated, saved, transmitted) the GDFRL to the autonomous processing nodes 505. For example, the GDFRL may prevent other autonomous processing nodes 505 from reassembling that particular data block. In some implementations, the unified lock structure may be generated independent of the requesting autonomous processing node 505. For example, the GDFRL may be homogenous among the autonomous processing nodes 505 and the DPRS 145. F When the autonomous processing nodes 505 have assembled the data block, in some implementations, the autonomous processing nodes 505 may, for example, then append the data block to the incomplete data file in a data file destination system 515.

In some implementations, after completely reassembling the data block, the autonomous processing node 505 (that just fully reassembled a first data block) may determine whether a data chunk of a second data block is received. For example, if a data chunk of a second data block is received, the autonomous processing node 505 may retain the assembly lock for the second data block. Accordingly, other autonomous processing nodes may, for example, be prevented from reassembling the second data block to advantageously reduce computing resources for redundantly discovering data chunks of the second data block. For example, computation resources for other autonomous processing nodes may be preserved.

Figure 6:
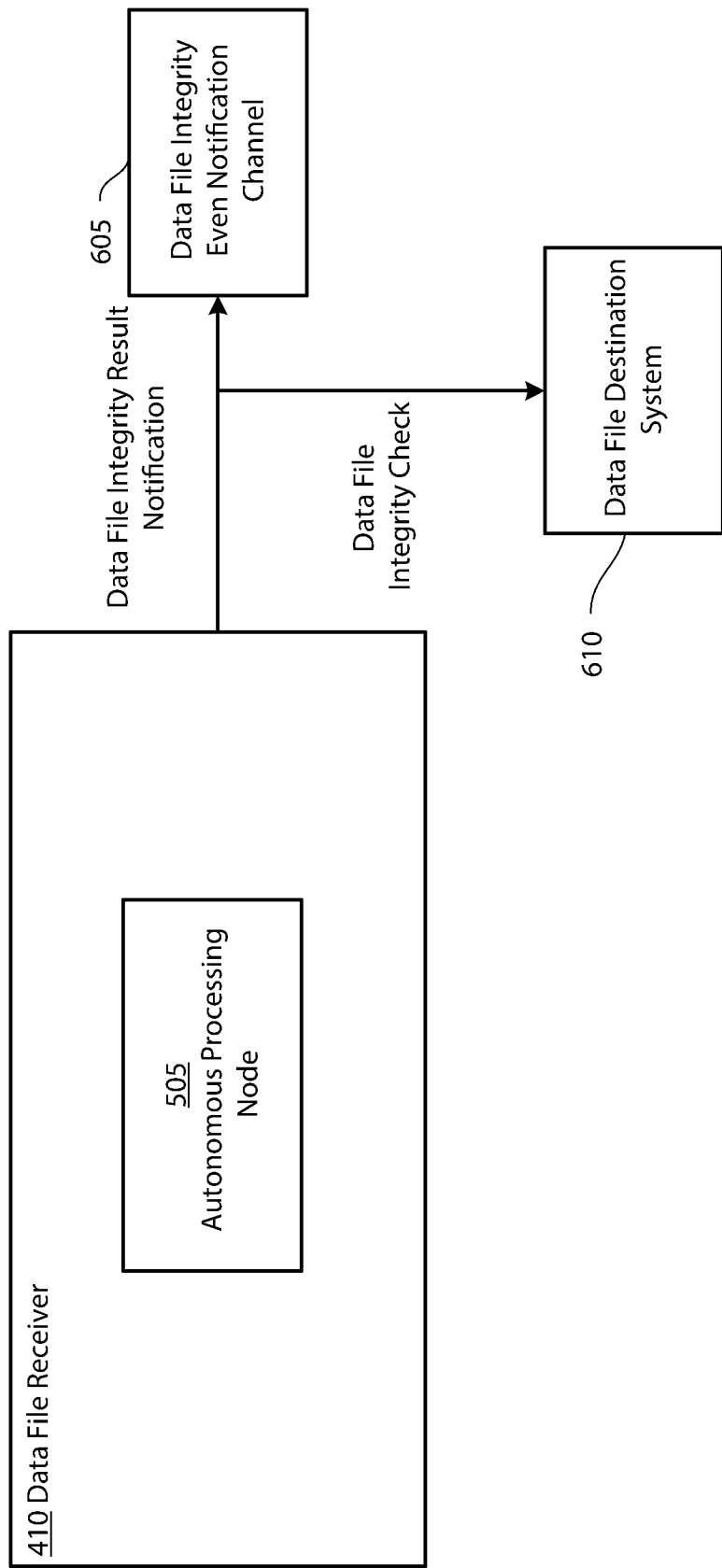
FIG. 6 is a block diagram depicting exemplary data verification modules of an exemplary data file receiver.

FIG. 6 is a block diagram depicting exemplary data verification modules of an exemplary Data File Receiver. As shown, the DFR 410 is connected to a data file integrity event notification channel 605 and a data file destination system 610. In this example, upon determining that a last data block has been reassembled and appended, the autonomous processing node 505 may, for example, notify the data file destination system 610. For example, the data file destination system 610 may perform a data file integrity check against a reassembled data file to guarantee integrity of the reassembled data file in the DFR 410 matches (e.g., exactly, according to (predetermined) criterion(s)) against a corresponding original data file's state (e.g., as it was in the DFS 405). Results of the data file integrity Check may, for example, then be reported to the data file integrity event notification channel 605, such as, for example, to invoke other required processes on the received data file.

Figure 7:
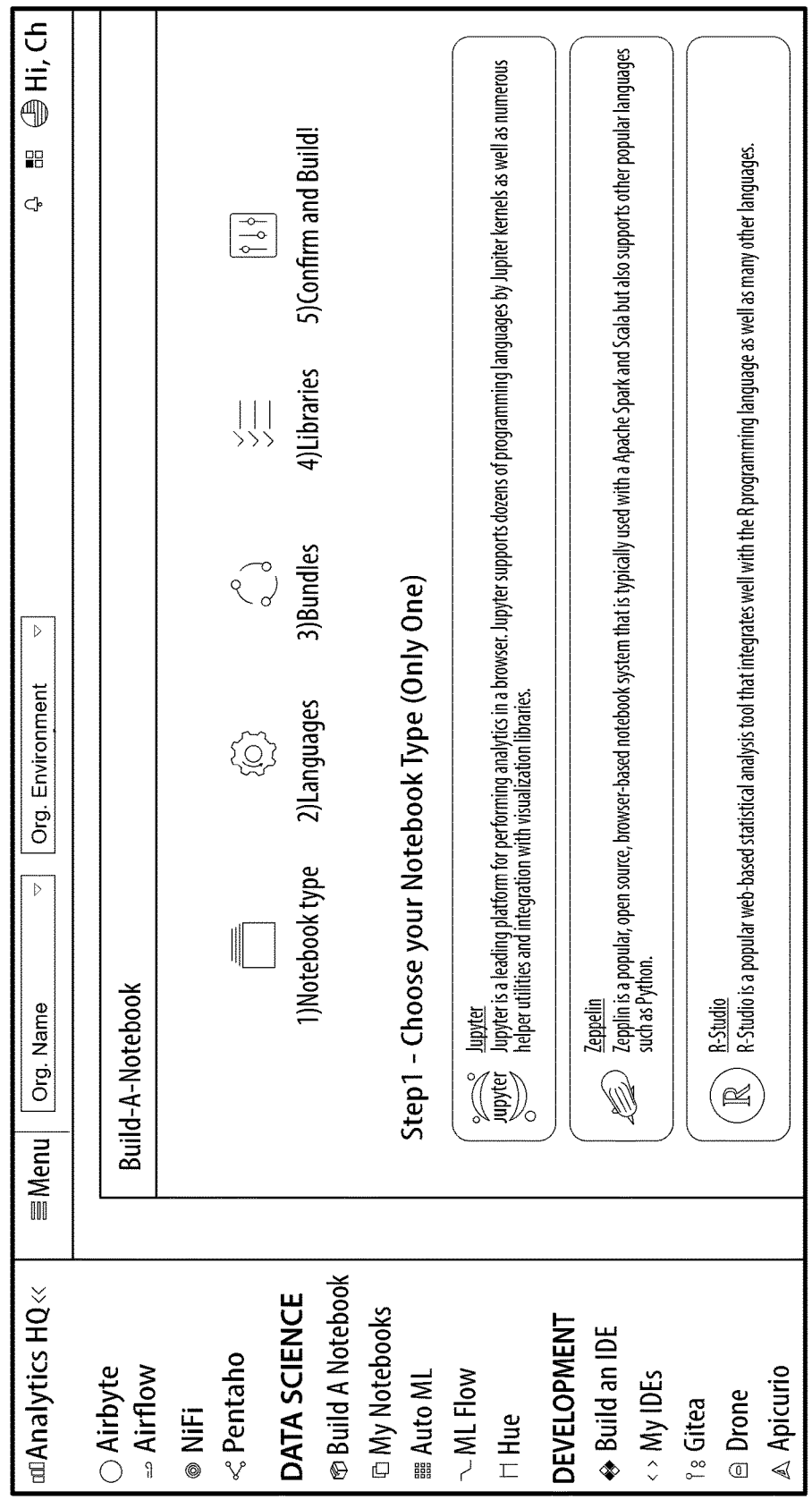

FIG. 7, FIG. 8, FIG. 9, FIG. 10, FIG. 11, FIG. 12A, FIG. 12B, and FIG. 13 depict exemplary user interfaces for deploying new tool instances in the DADP. For example, the UIs may be generated by the UI engine 205 of the UI layer 120. As shown in FIG. 7, when a user selects to build a notebook, for example, the UI engine 205 may generate a UI 700 to inquire the user for a notebook type for deployment. In this example, the user may select a Jupyter notebook, a Zeppelin notebook, or a R-studio notebook.

Figure 8:
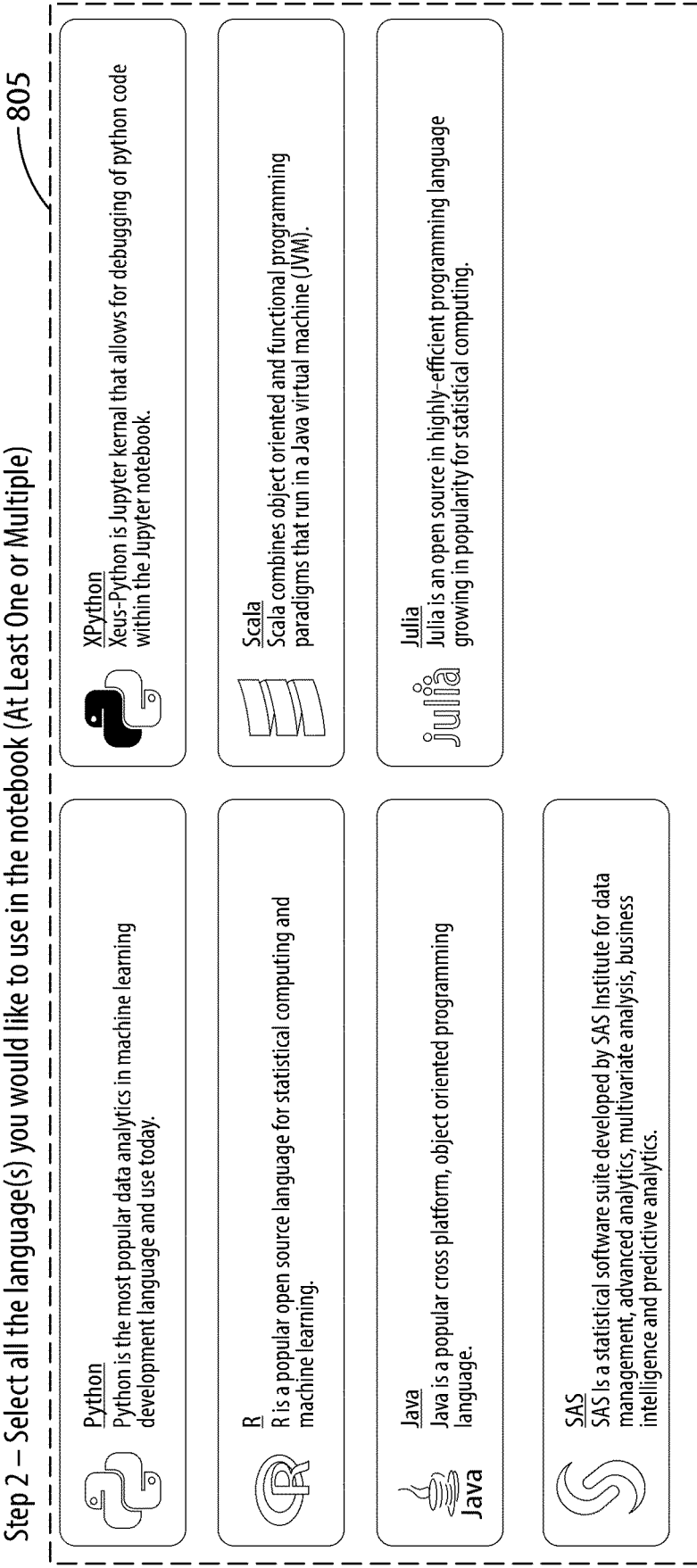

Based on the user notebook selection, for example, the UI engine may generate a UI 800 as shown in FIG. 8. For example, the user may use the UI 800 to select one or more languages to be used in the deployed notebook. In some implementations, the UI engine may use the PDPS 215 to generate language selections 805 based on a selection in the UI 700.

As shown in FIG. 9, a user may use a UI 900 to select one or more predetermined library bundles to be included in the deployed notebook. In this example, the user may select a target analysis (e.g., supervised learning, unsupervised learning, deep learning, statistical analysis, time series analysis, optimization, visualization and charting, distributed analysis, reinforced learning, model explainability). Based on the target analysis, the UI layer 120 may determine the library to be included based on the predetermined library bundles corresponding to the target analysis based on information in the PDPS 215. As shown FIG. 10, a UI 1000 provides a selection display for the user to further customize libraries to be added to the notebook.

Figure 12A:
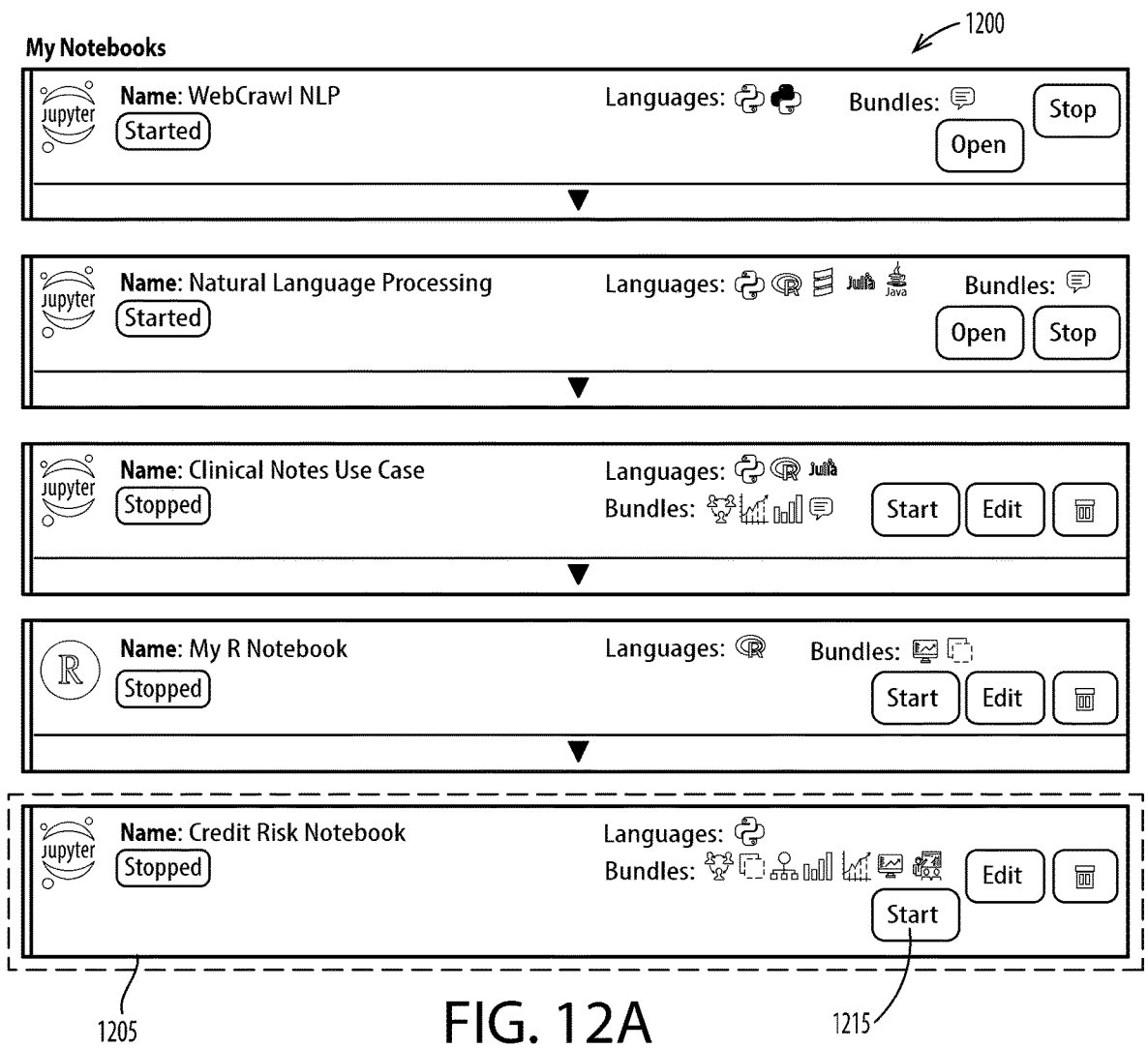
Figure 12B:
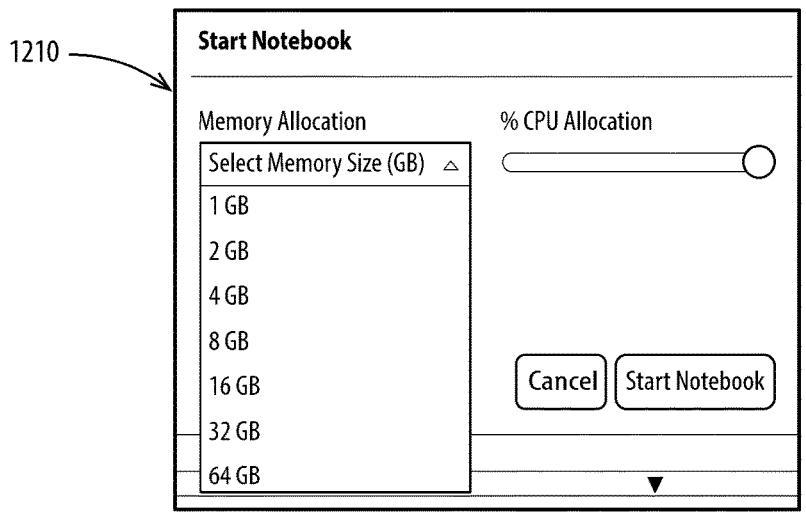

As shown in FIG. 11, a UI 1100 includes a summary of previous selections are displayed. The user may select a confirm button 1105 the selection or return to previous steps 1110 to update previous selections. In some implementations, when the user selects the confirm button 1105, the UI layer may, for example, generate a build notebook command to the API layer 125 to deploy a new instance of the selected notebook in the orchestration layer 130. As shown in FIG. 12A, a newly deployed notebook 1205 is included in a UI 1200. Upon selecting the notebook 1205, a resource allocation UI 1210 may be displayed as shown in FIG. 12B. In this example, the user may select with a memory allocation, and % CPU allocation to the notebook 1205. In some implementations, the UI layer 120 may transmit user selection to the central OS 250 via the API layer 125 by generating a command based on the user input.

Figure 13:
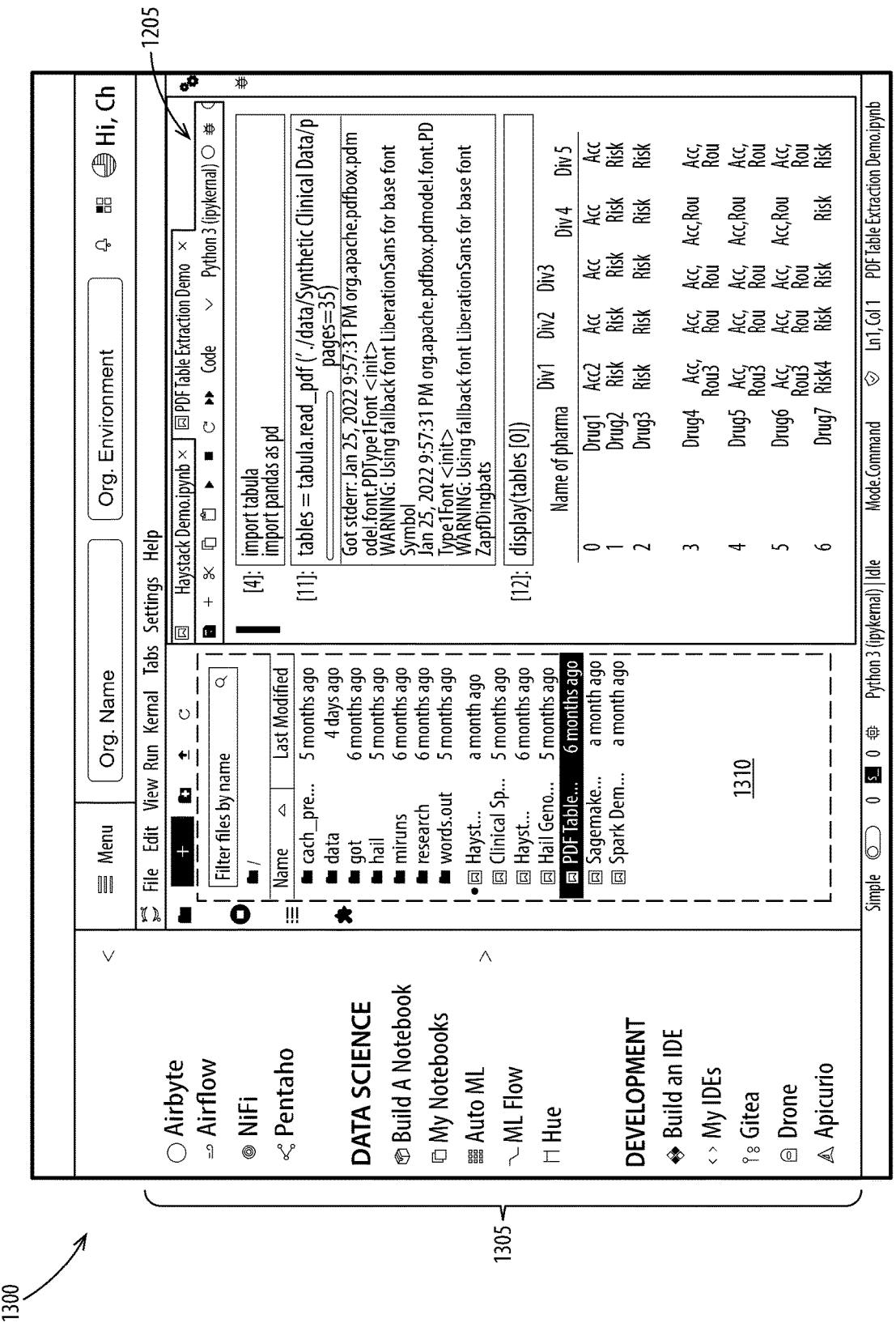

A UI 1300 displaying the notebook 1205 is shown in FIG. 13. For example, the UI 1300 may be displayed after the user selects a start button 1215 (FIG. 12A) to start an instance of the notebook 1205. In this example, the UI 1300 includes system input 1305. For example, the user may use the system input 1305 to control the ADE 255 of the user. As shown, the notebook 1205 also includes a navigation window 1310 for the user to navigate a mounted file system.

The UI 1300 includes an embedded display of output from an active tool instance (e.g., as shown, the notebook 1205). The UI 1300 includes visual indicia generated based on multiple connected tool instances connected to the active tool instance (e.g., the navigation window 1310, the "Data Science" and "Development" instances, menu bar). The UI 1300 includes a menu of commands (e.g., accessible through the "Menu" and/or hamburger menu icon button). The menu of commands may, for example, be generated based on the active tool instance. For example, the at least some of the menu of commands include environmental variables and/or commands selected based on the active tool instance and at least one of the connected tool instances. For example, the menu of commands may be generated based on input and/or generated by the orchestration layer and/or the central state database. The menu of commands may provide pre-generated commands for selection and execution based on the active tool instance and/or connected active tool instances.

Figure 14:
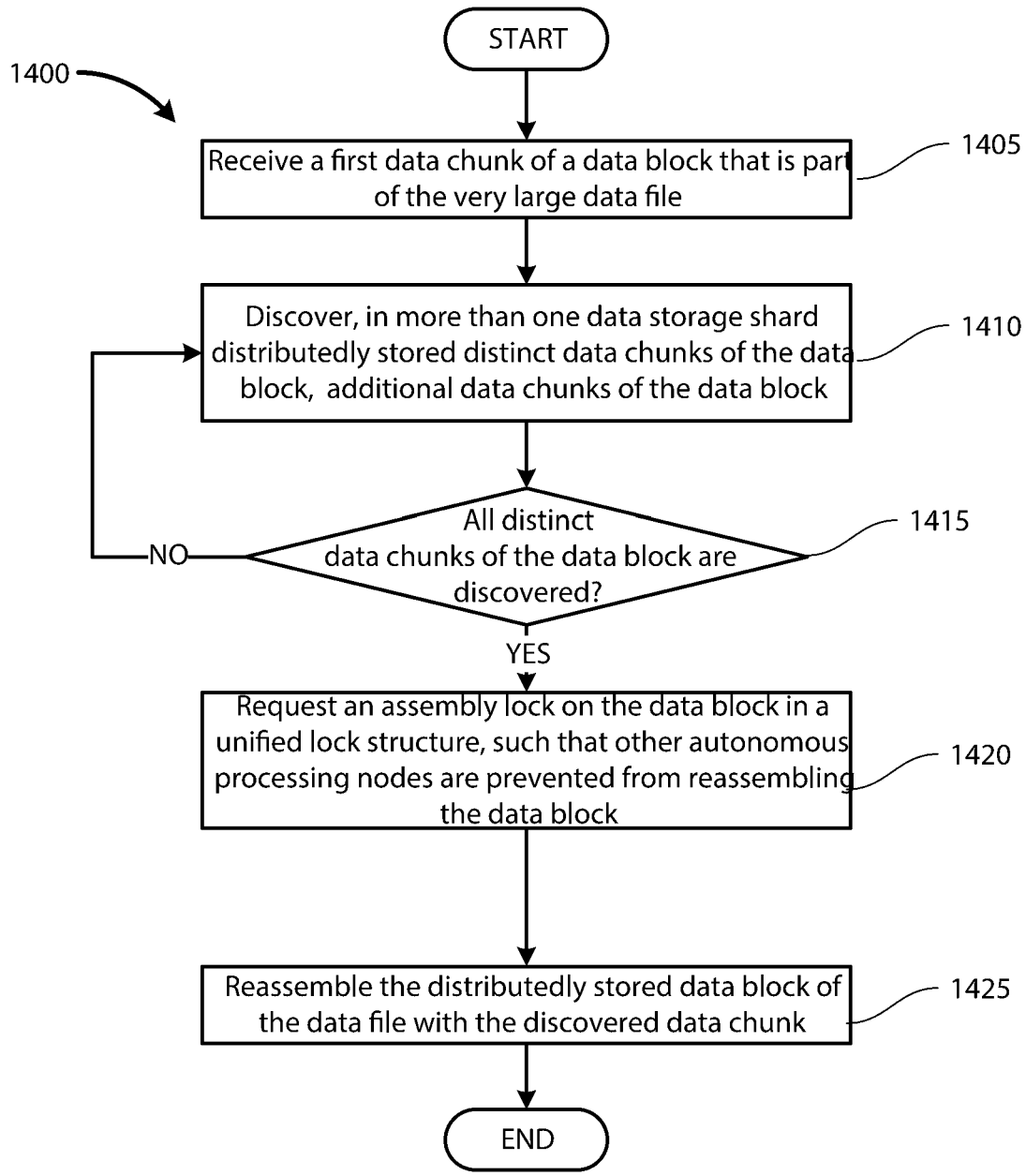
FIG. 14 is a flowchart illustrating an exemplary very large file transfer method.

FIG. 14 is a flowchart illustrating an exemplary very large file transfer method 1400. For example, the method 1400 may be performed by the DPRS 145 of the DADP 105. In this example, the method 1400 begins when a first data chunk of a data block that is part of the very large data file is received in step 1405. For example, at least one of the autonomous processing nodes 505 may receive a data chunk at one of the data chunk cache 315. In step 1410, in more than one data storage shards, additional data chunks of the data block are discovered. For example, the data storage shards may be the data chunk cache configured to distributedly store distinct data chunks of the data block.

In a decision point 1415, it is determined whether all distinct data chunks of the data block are discovered. If some distinct data chunks of the data block are not discovered, the step 1410 is repeated. If all distinct data chunks of the data block are discovered, an assembly lock is requested on the data block in a unified lock structure, such that other autonomous processing nodes are prevented from reassembling the data block in step 1420. For example, the autonomous processing nodes 505 may request a global data file reassembly lock from a data file reassembly lock system 510. Next, the distributedly stored data block of the data file is reassembled with the discovered data chunks in step 1425, and the method 1400 ends.

Figure 15:
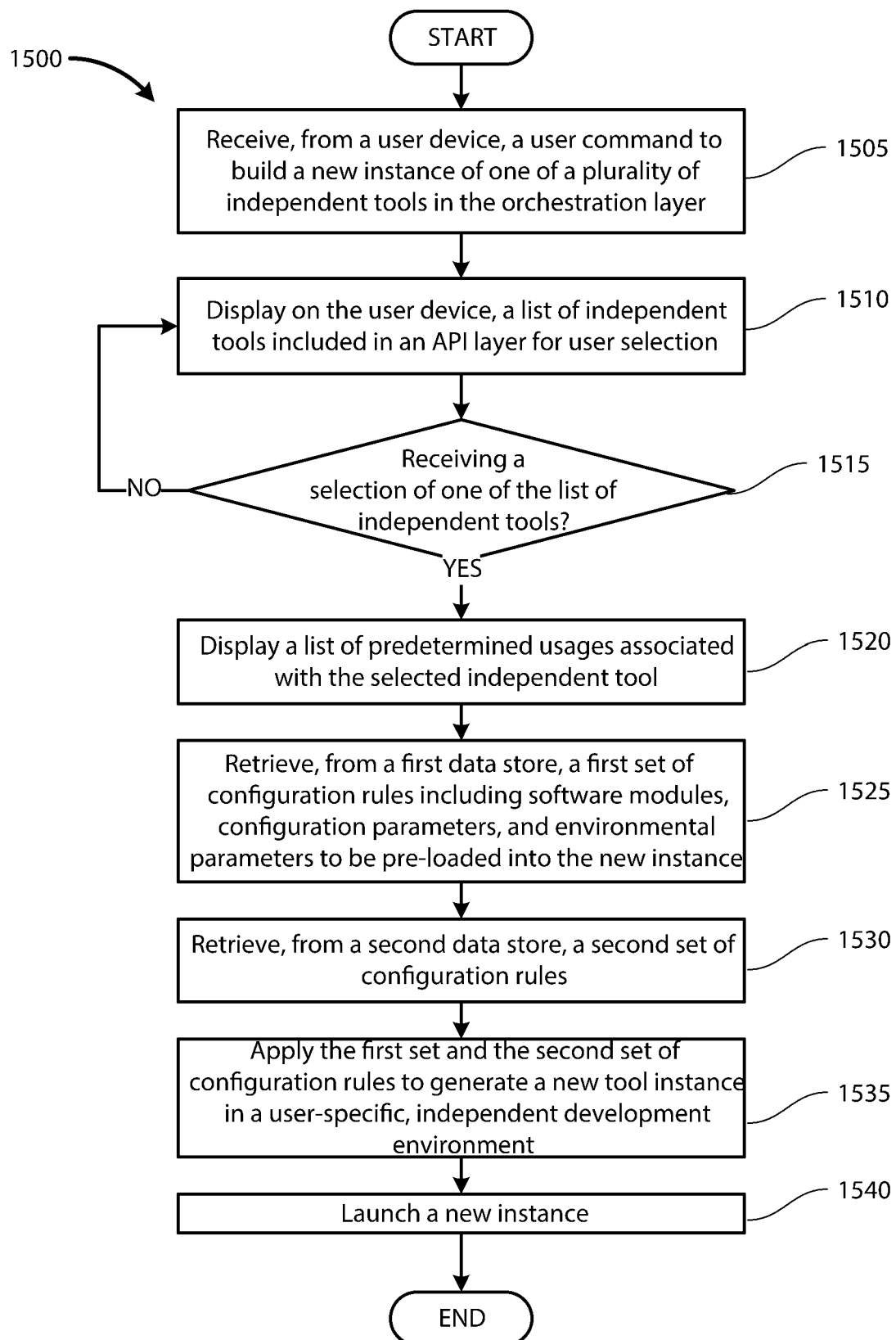
FIG. 15 is a flowchart illustrating an exemplary tools deployment method.

FIG. 15 is a flowchart illustrating an exemplary tools deployment method 1500. For example, the method 1500 may be performed by the ADS 115. The method 1500 begins in step 1505 when, from a user device, a user command is received to build a new instance of one of multiple independent tools in the orchestration layer for the standard user. For example, a user may use the user device 110 to transmit a command via a UI of the UI layer 120 to build a new AT instance 135.

In step 1510, on the user device, a list of independent tools included in an API layer is displayed for user selection. For example, the UI layer 120 may display the list of AT available at the API layer 125 based on user credentials. In a decision point 1515, it is determined whether a selection of one of the list of independent tools is received. If no selection is received, the step 1510 is repeated. If a selection of at least one independent tool is received, in step 1520, a list of predetermined usages associated with the selected independent tool is displayed. Next, from a first data store, a first set of configuration rules including software modules, configuration parameters, and environmental parameters to be pre-loaded into the new instance is retrieved in step 1525. For example, the CGE 210 may use the PDPS 215 to deploy AT instances 135 based on user input.

After the first set of configuration rules is retrieved, from a second data store, a second set of configuration rules is retrieved in step 1530. For example, the API server 235 may retrieve setting parameters (e.g., system configurations parameters, access keys) from the central state database 140.

In step 1535, the first set and the second set of configuration rules are applied to generate a new tool instance in a user-specific, independent development environment. For example, the AT tool instances may be generated in the ADE 255 corresponding to the user in the orchestration layer 130. In step 1540, a new instance is launched, and the method 1500 ends.

Figure 16:
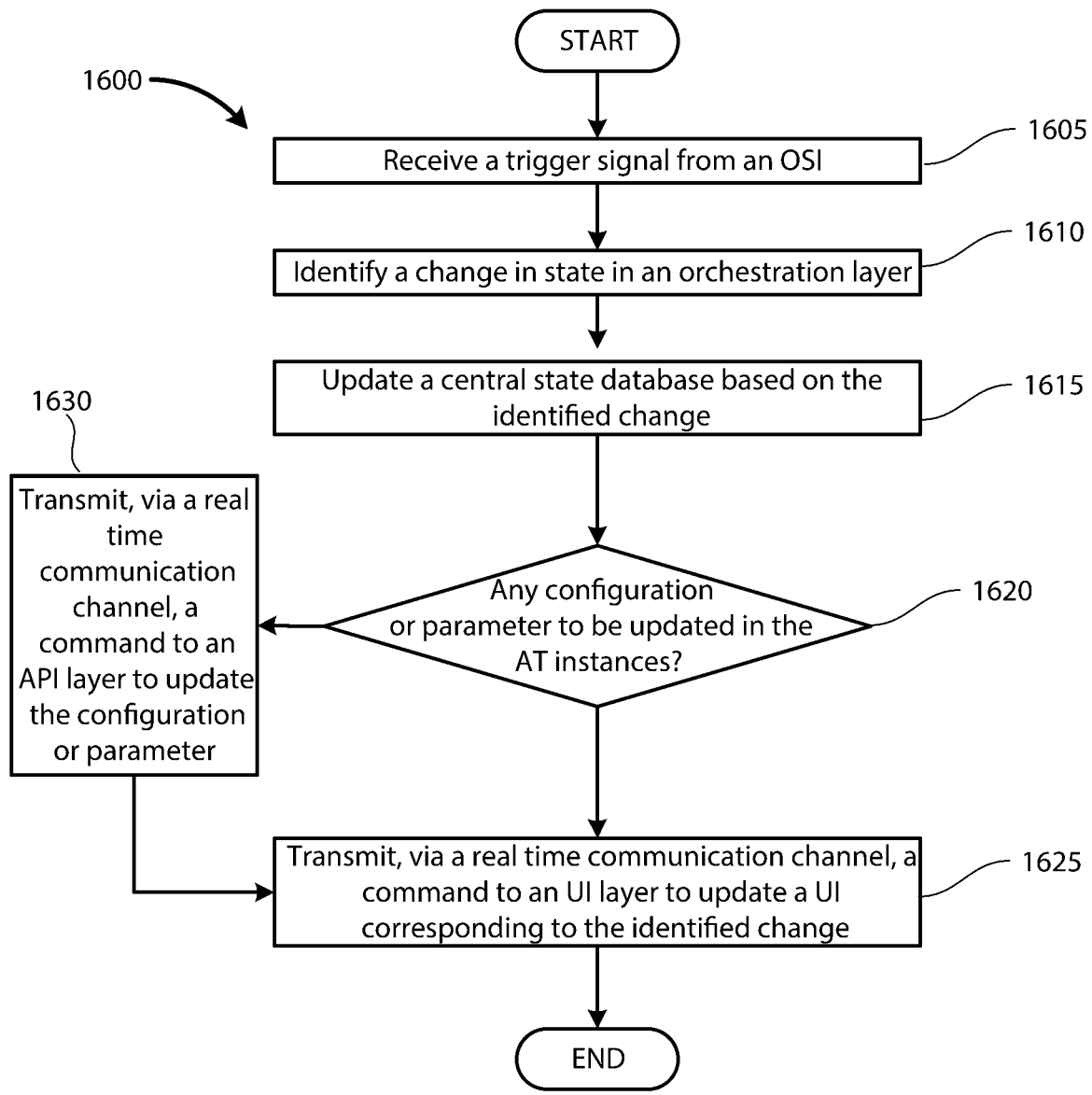
FIG. 16 is a flowchart illustrating an exemplary real-time state update method.

FIG. 16 is a flowchart illustrating an exemplary real-time state update method 1600. For example, the COS 265 may perform the method 1600 when a system trigger event (e.g., a mounting or dismounting of a file storage by a user) occurs. In this example, the method 1500 begins when a trigger signal is received from an OSI (e.g., the OSI 260) in step 1605. For example, the OSI 260 of one of the AT instances 135 may transmit a trigger signal to the COS 265 when a user may, via a UI, disconnect a cloud storage from the AT instance 135. In step 1610, a change in state in an orchestration layer is identified. Next, in step 1615, a central state database is updated based on the identified change. For example, the COS 265, upon identifying the change, generates a signal to the API layer 125 to update the central state database 140 based on the identified change.

In a decision point 1620, it is determined whether any configuration or parameter is to be updated in the AT instances. If it is determined that none of the deployed AT instances is to be updated, in step 1625, via a real time communication channel, a command to an UI layer is transmitted to update a UI corresponding to the identified change, and the method 1600 ends. For example, the command may be transmitted via a MQTT channel. For example, the UI of the user may be updated with the identified changes (e.g., adding a file structure if a remote storage device is mounted). If it is determined that any of the deployed AT instances is to be updated, in step 1630, via a real time communication channel, a command is transmitted to an API layer to update the configuration or parameter, and the step 1625 is performed.

Although various embodiments have been described with reference to the figures, other embodiments are possible.

For example, although an exemplary system has been described with reference to FIG. 1, other implementations may be deployed in other industrial, scientific, medical, commercial, and/or residential applications.

Computer program products may contain a set of instructions that, when executed by a processor device, cause the processor to perform prescribed functions. These functions may be performed in conjunction with controlled devices in operable communication with the processor. Computer program products, which may include software, may be stored in a data store tangibly embedded on a storage medium, such as an electronic, magnetic, or rotating storage device, and may be fixed or removable (e.g., hard disk, floppy disk, thumb drive, CD, DVD).

Although an example of a system, which may be portable, has been described with reference to the above figures, other implementations may be deployed in other processing applications, such as desktop and networked environments.

Temporary auxiliary energy inputs may be received, for example, from chargeable or single use batteries, which may enable use in portable or remote applications. Some embodiments may operate with other DC voltage sources, such as 9V (nominal) batteries, for example. Alternating current (AC) inputs, which may be provided, for example from a 50/60 Hz power port, or from a portable electric generator, may be received via a rectifier and appropriate scaling. Provision for AC (e.g., sine wave, square wave, triangular wave) inputs may include a line frequency transformer to provide voltage step-up, voltage step-down, and/or isolation.

Although particular features of an architecture have been described, other features may be incorporated to improve performance. For example, caching (e.g., L1, L2, . . . ) techniques may be used. Random access memory may be included, for example, to provide scratch pad memory and or to load executable code or parameter information stored for use during runtime operations. Other hardware and software may be provided to perform operations, such as network or other communications using one or more protocols, wireless (e.g., infrared) communications, stored operational energy and power supplies (e.g., batteries), switching and/or linear power supply circuits, software maintenance (e.g., self-test, upgrades), and the like. One or more communication interfaces may be provided in support of data storage and related operations.

Some systems may be implemented as a computer system that can be used with various implementations. For example, various implementations may include digital circuitry, analog circuitry, computer hardware, firmware, software, or combinations thereof. Apparatus can be implemented in a computer program product tangibly embodied in an information carrier, e.g., in a machine-readable storage device, for execution by a programmable processor; and methods can be performed by a programmable processor executing a program of instructions to perform functions of various embodiments by operating on input data and generating an output. Various embodiments can be implemented advantageously in one or more computer programs that are executable on a programmable system including at least one programmable processor coupled to receive data and instructions from, and to transmit data and instructions to, a data storage system, at least one input device, and/or at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, which may include a single processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including, by way of example, semiconductor memory devices, such as EPROM, EEPROM, and flash memory devices; magnetic disks, such as internal hard disks and removable disks; magneto-optical disks; and, CD-ROM and DVD-ROM disks. The processor and the memory can be supplemented by, or incorporated in, ASICs (application-specific integrated circuits).

In some implementations, each system may be programmed with the same or similar information and/or initialized with substantially identical information stored in volatile and/or non-volatile memory. For example, one data interface may be configured to perform auto configuration, auto download, and/or auto update functions when coupled to an appropriate host device, such as a desktop computer or a server.

In some implementations, one or more user-interface features may be custom configured to perform specific functions. Various embodiments may be implemented in a computer system that includes a graphical user interface and/or an Internet browser. To provide for interaction with a user, some implementations may be implemented on a computer having a display device, such as a CRT (cathode ray tube) or LCD (liquid crystal display) monitor for displaying information to the user, a keyboard, and a pointing device, such as a mouse or a trackball by which the user can provide input to the computer.

In various implementations, the system may communicate using suitable communication methods, equipment, and techniques. For example, the system may communicate with compatible devices (e.g., devices capable of transferring data to and/or from the system) using point-to-point communication in which a message is transported directly from the source to the receiver over a dedicated physical link (e.g., fiber optic link, point-to-point wiring, daisy-chain). The components of the system may exchange information by any form or medium of analog or digital data communication, including packet-based messages on a communication network. Examples of communication networks include, e.g., a LAN (local area network), a WAN (wide area network), MAN (metropolitan area network), wireless and/or optical networks, the computers and networks forming the Internet, or some combination thereof. Other implementations may transport messages by broadcasting to all or substantially all devices that are coupled together by a communication network, for example, by using omni-directional radio frequency (RF) signals. Still other implementations may transport messages characterized by high directivity, such as RF signals transmitted using directional (i.e., narrow beam) antennas or infrared signals that may optionally be used with focusing optics. Still other implementations are possible using appropriate interfaces and protocols such as, by way of example and not intended to be limiting, USB 2.0, Firewire, ATA/IDE, RS-232, RS-422, RS-485, 802.11a/b/g, Wi-Fi, Ethernet, IrDA, FDDI (fiber distributed data interface), token-ring networks, multiplexing techniques based on frequency, time, or code division, or some combination thereof. Some implementations may optionally incorporate features such as error checking and correction (ECC) for data integrity, or security measures, such as encryption (e.g., WEP) and password protection.

In various embodiments, the computer system may include Internet of Things (IoT) devices. IoT devices may include objects embedded with electronics, software, sensors, actuators, and network connectivity which enable these objects to collect and exchange data. IoT devices may be in-use with wired or wireless devices by sending data through an interface to another device. IoT devices may collect useful data and then autonomously flow the data between other devices.

Various examples of modules may be implemented using circuitry, including various electronic hardware. By way of example and not limitation, the hardware may include transistors, resistors, capacitors, switches, integrated circuits, other modules, or some combination thereof. In various examples, the modules may include analog logic, digital logic, discrete components, traces and/or memory circuits fabricated on a silicon substrate including various integrated circuits (e.g., FPGAs, ASICs), or some combination thereof. In some embodiments, the module(s) may involve execution of preprogrammed instructions, software executed by a processor, or some combination thereof. For example, various modules may involve both hardware and software.

In an illustrative aspect, an integrated data science development system may include a user interface (UI) layer deployed on at least a first node in a distributed network and configured to independently display information and receive user input at a user device of one of multiple standard users. The system may include an API layer deployed on at least a second node in the distributed network and including interfaces of multiple independent tools to be used by the multiple standard users. The system may include an orchestration layer deployed on at least a third node in the distributed network and in communication with multiple computing nodes in a network. The orchestration layer may include, for each of the multiple standard users, tool instances of the multiple independent tools deployed for each of the multiple standard users. The independent tools may include independent computing software packages configured to perform data science operations. The orchestration layer may include, for each of the multiple standard users, a multi-instance common orchestration service (COS) having an orchestration service instance deployed in each of the tool instances such that the COS is configured to access a current state of each tool instance associated with the user in the orchestration layer and update a dynamic system state profile based on a current state of each of the tool instances, the dynamic system state profile including settings, access keys, and metadata configured to provide autonomous inter-communication between the instances and the independent tools. The orchestration layer may be configured to facilitate deployment operations to autonomously deploy predetermined data science tools based on user selections and user credentials in a distributed data science development environment. The deployment operations may include receive, from the user device, a user command to build a new instance of one of multiple independent tools in the orchestration layer for the standard user. The deployment operations may include display on the user device, through the UI layer, the multiple independent tools included in the API layer for user selection. The deployment operations may include, upon receiving a selection of at least one of the multiple independent tools, display, through the UI layer, multiple predetermined usages associated with the selected independent tool. The deployment operations may include retrieve, from a first data store, a first set of configuration rules as a function of (a) the selected independent tool, (b) a selected usage of the selected independent tool, and (c) a credential of a user transmitting the user command. The first set of configuration rules may include software modules, configuration parameters, and environmental parameters to be pre-loaded into the new instance. The deployment operations may include retrieve, from a second data store, a second set of configuration rules as a function of the dynamic system state profile. The deployment operations may include apply the first set and the second set of configuration rules to generate a new tool instance in a user-specific, independent development environment, such that (a) inter-communications between the new instance and previously deployed instances connected to the orchestration layer, and (b) the independent tools at the API layer, are autonomously configured based on the current state retrieved from the common orchestration service. The deployment operations may include launch a new instance of the COS in the new tool instance.

The common orchestration service may monitor the current state of the orchestration layer and the API layer in real-time such that a change in the current state actively triggers a control signal to the UI layer to update the user interface.

The deployment operations may include receive, from the user device, a user command to connect the new tool instance to at least one predetermined external file storage service provider. The deployment operations may include update the UI layer to receive user credentials to access the at least one predetermined external file storage provider. The deployment operations may include transmit the user credentials to connect the new tool instance to the at least one external file storage provider.

Each instance of the COS may include a system common instance configured to provide automated system services. The system services may include monitor a service health status of the instance of the COS. The system services may include update the service health status to the dynamic system state profile.

The automated system services may include a suite of APIs configured to provide automatic and standardize functions for each instance of the COS.

The system common instance may include at least one software module programmed in RUST programming language.

The system common instance may include at least one software module programmed as a REST service.

The multiple independent tools may include at least one Jupyter Notebook.

The integrated data science development system may include a first communication channel between the UI layer and the API layer. The system may include a second communication channel between the API layer and the orchestration layer. The first communication channel and the second communication channel may be configured to be a persistent connection, such that a change in a state within the UI layer, the API layer, and the orchestration layer is automatically broadcasted system-wide in real-time. The persistent connection may include a MQ Telemetry Transport (MQTT) protocol channel.

The deployment operations may include display the new instance at a user interface at the user device.

At least two of the first node, the second node, and the third node may be implemented on a single device.

The UI layer may be configured to perform dynamic UI command operations. The dynamic UI command operations may include generate, on the user device, an embedded display. The embedded display may include a current display of output from an active tool instance. The embedded display may include visual indicia generated based on multiple connected tool instances connected to the active tool instance. The embedded display may include a menu of commands generated based on the active tool instance. At least some of the menu of commands include environmental variables selected based on the active tool instance and at least one of the multiple connected tool instances.

In an illustrative aspect, a computer-implemented method may be performed by distributed autonomous processing nodes to transfer excess size data files across a network. The method may include receive, at an autonomous processing node of multiple autonomous processing nodes, a first data chunk of a data block that is part of a data file. The method may include discover, by the autonomous processing node and in multiple data storage shards, additional data chunks of the data block. The multiple data storage shards may distributedly store distinct data chunks of the data block. The method may include, upon determining that all distinct data chunks corresponding to the data block are discovered, perform reassembly operations.

The reassembly operations may include request an assembly lock on the data block in a unified lock structure. The reassembly operations may include, when the assembly lock is obtained such that other autonomous processing nodes are prevented from reassembling the data block, then reassemble the distributedly stored data block of the data file with the discovered data chunks. The multiple autonomous processing nodes may receive and discover in parallel the distinct data chunks of the data block while the autonomous process node exclusively reassembles the data block, such that the distributedly stored distinct data chunks are discovered in parallel by more than one autonomous processing node. When all of the distinct data chunks of the data block are discovered, computational resources may be preserved by preventing more than one autonomous processing node from reassembling the data block.

The method may include determine a maximum size of the data chunks based on parameters received from a recipient device, such that, for example, the oversize data file includes files exceeding available memory of the recipient device in the network is transferred efficiently.

The method may include, upon complete reassembling the data block, determine whether a data chunk of a second data block is received. The method may include retain the assembly lock for the second data block, such that other autonomous processing nodes are prevented from reassembling the second data block.

The autonomous processing nodes may be passively activated by a trigger event, such that no active management resource is allocated to actively manage the autonomous processing nodes.

The autonomous processing nodes may be independent and anonymous, such that there is no direct communication between the autonomous processing nodes and the autonomous processing nodes do not receive commands from a central master.

The data chunks may be uniquely distributed into the multiple data storage shards based on a predetermined access time.

The assembly lock may include a hash of the oversize data file, and an identification of a corresponding data block.

The identifications may, for example, be sequential and/or dynamically generated based on predetermined system parameters.

The unified lock structure may be independent of the autonomous processing nodes in the network.

The autonomous processing nodes may be configured to automatically operate without active management.

A number of implementations have been described. Nevertheless, it will be understood that various modifications may be made. For example, advantageous results may be achieved if the steps of the disclosed techniques were performed in a different sequence, or if components of the disclosed systems were combined in a different manner, or if the components were supplemented with other components. Accordingly, other implementations are contemplated within the scope of the following claims.

What is claimed is:

1. An integrated data science development system, comprising:
   a user interface (UI) layer deployed on at least a first node in a distributed network and configured to independently display information and receive user input at a user device of one of multiple standard users;
   an API layer deployed on at least a second node in the distributed network and comprising interfaces of a plurality of independent tools to be used by the multiple standard users; and,
   an orchestration layer deployed on at least a third node in the distributed network and in communication with multiple computing nodes in a network, the orchestration layer comprising, for each of the multiple standard users:
      tool instances of the plurality of independent tools deployed for each of the multiple standard users, wherein the plurality of independent tools include independent computing software packages configured to perform data science operations; and,
      a multi-instance common orchestration service (COS) having an orchestration service instance deployed in each of the tool instances such that the COS is configured to access a current state of each tool instance associated with the one of multiple standard users in the orchestration layer and update a dynamic system state profile based on the current state of each of the tool instances, the dynamic system state profile comprising settings, access keys, and metadata configured to provide autonomous inter-communication between the tool instances and the independent tools;
   wherein, at least one of the first node, the second node, and the third node comprise a physical device comprising a non-transitory computer readable medium, and the orchestration layer is configured to facilitate deployment operations to autonomously deploy predetermined data science tools based on user selections and user credentials in a distributed data science development environment, wherein the deployment operations comprise:
      receive, from the user device, a user command to build a new instance of one of a plurality of independent tools in the orchestration layer for the one of multiple standard users;
      display on the user device, through the UI layer, the plurality of independent tools included in the API layer for user selection; upon receiving a selection of at least one of the plurality of independent tools, display, through the UI layer, a plurality of predetermined usages associated with the selected independent tool;
      retrieve, from a first data store, a first set of configuration rules as a function of (a) the selected independent tool, (b) a selected usage of the selected independent tool, and (c) a credential of a user transmitting the user command, wherein the first set of configuration rules comprises software modules, configuration parameters, and environmental parameters to be pre-loaded into the new instance;
      retrieve, from a second data store, a second set of configuration rules as a function of the dynamic system state profile;
      apply the first set and the second set of configuration rules to generate a new tool instance in a user-specific, independent development environment, such that (a) inter-communications between the new instance and previously deployed instances connected to the orchestration layer, and (b) the independent tools at the API layer, are autonomously configured based on the current state retrieved from the common orchestration service, and, launch a new instance of the COS in the new tool instance.

2. The integrated data science development system of claim 1, wherein the COS monitors the current state of the orchestration layer and the API layer in real-time such that a change in the current state actively triggers a control signal to the UI layer to update the user interface.

3. The integrated data science development system of claim 1, wherein the deployment operations further comprising:

receive, from the user device, a user command to connect the new tool instance to at least one predetermined external file storage service providers;

update the UI layer to receive user credentials to access the at least one predetermined external file storage provider; and, transmit the user credentials to connect the new tool instance to the at least one external file storage provider.

4. The integrated data science development system of claim 1, wherein each instance of the COS comprises a system common instance configured to provide automated system services, wherein the system services comprising:

monitor a service health status of the instance of the COS; and, update the service health status to the dynamic system state profile.

5. The integrated data science development system of claim 4, wherein the automated system services further comprise a suite of APIs configured to provide automatic and standardize functions for each instance of the COS.

6. The integrated data science development system of claim 4, wherein the system common instance comprises at least one software module programmed as a REST service.

7. The integrated data science development system of claim 1, wherein the plurality of independent tools comprises at least one Jupyter Notebook.

8. The integrated data science development system of claim 1, further comprising:

a first communication channel between the UI layer and the API layer; and, a second communication channel between the API layer and the orchestration layer, wherein the first communication channel and the second communication channel are configured to be a persistent connection, such that a change in a state within the UI layer, the API layer, and the orchestration layer is automatically broadcasted system-wide in real-time.

9. The integrated data science development system of claim 8, wherein the persistent connection comprises a MQ Telemetry Transport (MATT) protocol channel.

10. The integrated data science development system of claim 1, wherein the deployment operations further comprise display the new instance at a user interface at the user device.

11. The integrated data science development system of claim 1, wherein at least two of the first node, the second node, and the third node are implemented on a single device.

12. The integrated data science development system of claim 1, wherein the UI layer is configured to perform dynamic UI command operations, the dynamic UI command operations comprising:

generate, on the user device, an embedded display comprising:

a current display of output from an active tool instance;

visual indicia generated based on a plurality of connected tool instances connected to the active tool instance; and, a menu of commands generated based on the active tool instance, wherein at least some of the menu of commands include environmental variables selected based on the active tool instance and at least one of the plurality of connected tool instances.

13. A computer program product (CPP) comprising a program of instructions tangibly embodied on a non-transitory computer readable medium wherein, when the instructions are executed on a processor, the processor causes tool instance deployment operations to be performed to autonomously deploy predetermined data science tools based on user selections and user credentials in a distributed data science development environment, the operations comprising:

receive, from a user device, a user command to build a new instance of one of a plurality of independent tools for one of multiple standard users;

display on the user device, through a user interface (UI) layer, the plurality of independent tools included in an API layer for user selection, wherein:

the UI layer is deployed on at least a first node in a distributed network and configured to independently display information and receive user input at a user device of one of the multiple standard users, and, the API layer is deployed on at least a second node in the distributed network and comprising interfaces of a plurality of independent tools to be used by the multiple standard users;

upon receiving a selection of at least one of the plurality of independent tools, display, through the UI layer, a plurality of predetermined usages associated with the selected independent tool;

retrieve, from a first data store, a first set of configuration rules as a function of (a) the selected independent tool, (b) a selected usage of the selected independent tool, and (c) a credential of a user transmitting the user command, wherein the first set of configuration rules comprises software modules, configuration parameters, and environmental parameters to be pre-loaded into the new instance;

retrieve, from a second data store, a second set of configuration rules as a function of a dynamic system state profile comprising settings, access keys, and metadata configured to provide autonomous inter-communication between the tool instances and the independent tools;

apply the first set and the second set of configuration rules to generate a new tool instance in a user-specific, independent development environment, such that (a) inter-communications between the new instance and previously deployed instances are connected to an orchestration layer, and (b) the independent tools at the API layer, are autonomously configured based on a current state of the one of multiple standard users; and, launch a new instance in an orchestration layer comprising a multi-instance common orchestration service (COS), wherein the orchestration layer is deployed on at least a third node in the distributed network and in communication with multiple computing nodes in a network, the orchestration layer comprising:

for each of the multiple standard users, tool instances of the plurality of independent tools deployed for each of the multiple standard users, wherein the independent tools comprise independent computing software packages configured to perform data science operations, wherein, the multi-instance COS having an orchestration service instance is deployed in each of the tool instances such that the COS is configured to access the current state associated with the one of multiple standard users of each tool instance and update the dynamic system state profile based on the current state of each of the tool instances.

14. The CPP of claim 13, wherein the multi-instance COS monitors the current state of the orchestration layer and the API layer in real-time such that a change in the current state actively triggers a control signal to the UI layer to update the user interface.

15. The CPP of claim 13, the operations further comprising:

receive, from the user device, a user command to connect the new tool instance to at least one predetermined external file storage service providers;

update the UI layer to receive user credentials to access the at least one predetermined external file storage provider; and, transmit the user credentials to connect the new tool instance to the at least one external file storage provider.

16. The CPP of claim 13, wherein each instance of the COS comprises a system common instance configured to provide automated system services, wherein the system services comprising:

monitor a service health status of the instance of the COS; and, update the service health status to the dynamic system state profile.

17. The CPP of claim 16, wherein the automated system services further comprise a suite of APIs configured to provide automatic and standardize functions for each instance of the COS.

18. The CPP of claim 16, wherein the system common instance comprises at least one software module programmed as a REST service.

19. The CPP of claim 13, wherein the plurality of independent tools comprises at least one Jupyter Notebook.

20. The CPP of claim 13, further comprising:

a first communication channel between the UI layer and the API layer; and, a second communication channel between the API layer and the orchestration layer, wherein the first communication channel and the second communication channel are configured to be a persistent connection, such that a change in a state within the UI layer, the API layer, and the orchestration layer is automatically broadcasted system-wide in real-time.

21. A computer-implemented method performed by at least one processor to cause tool instance deployment operations to be performed to autonomously deploy predetermined data science tools based on user selections and user credentials in a distributed data science development environment, the method comprising:

receive, from a user device, a user command to build a new instance of one of a plurality of independent tools for one of multiple standard users;

display on the user device, through a user interface (UI) layer, the plurality of independent tools included in an API layer for user selection, wherein:

the UI layer is deployed on at least a first node in a distributed network and configured to independently display information and receive user input at a user device of one of the multiple standard users, and, the API layer is deployed on at least a second node in the distributed network and comprising interfaces of a plurality of independent tools to be used by the multiple standard users;

upon receiving a selection of at least one of the plurality of independent tools, display, through the UI layer, a plurality of predetermined usages associated with the selected independent tool;

retrieve, from a first data store, a first set of configuration rules as a function of (a) the selected independent tool, (b) a selected usage of the selected independent tool, and (c) a credential of a user transmitting the user command, wherein the first set of configuration rules comprises software modules, configuration parameters, and environmental parameters to be pre-loaded into the new instance;

retrieve, from a second data store, a second set of configuration rules as a function of a dynamic system state profile comprising settings, access keys, and metadata configured to provide autonomous inter-communication between the tool instances and the independent tools;

apply the first set and the second set of configuration rules to generate a new tool instance in a user-specific, independent development environment, such that (a) inter-communications between the new instance and previously deployed instances are connected to an orchestration layer, and (b) the independent tools at the API layer, are autonomously configured based on a current state of the one of multiple standard user; and, launch a new instance in an orchestration layer comprising a multi-instance common orchestration service (COS), wherein the orchestration layer is deployed on at least a third node in the distributed network and in communication with multiple computing nodes in a network, the orchestration layer comprising:

for each of the multiple standard users, tool instances of the plurality of independent tools deployed for each of the multiple standard users, wherein the independent tools comprise independent computing software packages configured to perform data science operations, wherein, the multi-instance COS having an orchestration service instance is deployed in each of the tool instances such that the COS is configured to access the current state associated with the one of multiple standard users of each tool instance and update the dynamic system state profile based on the current state of each of the tool instances.

22. The method of claim 21, wherein the COS monitors the current state of the orchestration layer and the API layer in real-time such that a change in the current state actively triggers a control signal to the UI layer to update the user interface.

23. The method of claim 21, the operations further comprising:
receive, from the user device, a user command to connect the new tool instance to at least one predetermined external file storage service provider;
update the UI layer to receive user credentials to access the at least one predetermined external file storage provider; and,
transmit the user credentials to connect the new tool instance to the at least one predetermined external file storage provider.

24. The method of claim 21, wherein each instance of the COS comprises a system common instance configured to provide automated system services, wherein the system services comprising:
monitor a service health status of the tool instances of the COS; and,
update the service health status to the dynamic system state profile.

25. The method of claim 24, wherein the automated system services further comprise a suite of APIs configured to provide automatic and standardize functions for each tool instance of the COS.

26. The method of claim 24, wherein the system common instance comprises at least one software module programmed as a REST service.

27. The method of claim 21, wherein the plurality of independent tools comprises at least one Jupyter Notebook.

28. The method of claim 21, further comprising:
a first communication channel between the UI layer and the API layer; and,
a second communication channel between the API layer and the orchestration layer, wherein the first communication channel and the second communication channel are configured to be a persistent connection, such that a change in a state within the UI layer, the API layer, and the orchestration layer is automatically broadcasted system-wide in real-time.

* * * * *